United States Patent
Park et al.

(10) Patent No.: US 12,229,061 B2
(45) Date of Patent: Feb. 18, 2025

(54) ELECTRIC DEVICE INCLUDING BRANCHED SIGNAL LINES, AND ELECTRIC DEVICE INCLUDING PRINTED CIRCUIT BOARD

(71) Applicant: Samsung Electronics Co., Ltd., Suwon-si (KR)

(72) Inventors: Kwangsoo Park, Suwon-si (KR); Jae-Sang Yun, Hwaseong-si (KR); Su-Jin Kim, Hwaseong-si (KR); Jiwoon Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 269 days.

(21) Appl. No.: 17/670,962

(22) Filed: Feb. 14, 2022

(65) Prior Publication Data
US 2022/0414033 A1 Dec. 29, 2022

(30) Foreign Application Priority Data
Jun. 24, 2021 (KR) .................. 10-2021-0081960

(51) Int. Cl.
*G06F 13/16* (2006.01)
*G06F 13/40* (2006.01)

(52) U.S. Cl.
CPC ...... *G06F 13/1689* (2013.01); *G06F 13/1621* (2013.01); *G06F 13/4068* (2013.01)

(58) Field of Classification Search
CPC ............. G06F 13/1689; G06F 13/1621; G06F 13/4068
USPC ....................................................... 711/104
See application file for complete search history.

(56) References Cited

U.S. PATENT DOCUMENTS

| | | | |
|---|---|---|---|
| 6,661,092 B2 | 12/2003 | Shibata et al. | |
| 7,646,212 B2 * | 1/2010 | Sung | G11C 5/063 326/31 |
| 7,746,095 B2 | 6/2010 | Pax et al. | |
| 8,036,011 B2 | 10/2011 | Kim et al. | |
| 9,940,984 B1 * | 4/2018 | Hossain | G06F 13/1684 |
| 9,980,366 B2 | 5/2018 | Subramanian | |
| 10,437,766 B2 | 10/2019 | Park et al. | |
| 10,750,610 B2 | 8/2020 | Paek et al. | |

(Continued)

FOREIGN PATENT DOCUMENTS

KR 10-2019-0135827 A 12/2019

*Primary Examiner* — Titus Wong
(74) *Attorney, Agent, or Firm* — Harness, Dickey & Pierce, P.L.C.

(57) ABSTRACT

Disclosed is an electronic device which includes a plurality of memory devices, a memory controller, a first signal line that makes electrical connection between the memory controller and a first branch point, a second signal line that makes electrical connection between the first branch point and a second branch point, a third signal line that makes electrical connection between the first branch point and a third branch point, a fourth signal line that electrically connects the second branch point and the first memory device, a fifth signal line that electrically connects the second branch point and the second memory device, a sixth signal line that electrically connects the third branch point and the third memory device, and a stub that includes a first end electrically connected with at least one of the plurality of signal lines, and a second end being left open-circuit.

20 Claims, 31 Drawing Sheets

(56) References Cited

U.S. PATENT DOCUMENTS

| | | | |
|---|---|---|---|
| 10,824,580 B2 | 11/2020 | Kim et al. | |
| 2003/0037216 A1* | 2/2003 | Shibata | G11C 5/147 |
| | | | 711/200 |
| 2008/0043780 A1* | 2/2008 | Kobayashi | G11C 29/24 |
| | | | 370/506 |
| 2009/0243649 A1* | 10/2009 | Pax | G11C 5/04 |
| | | | 326/21 |
| 2010/0125693 A1* | 5/2010 | Kim | G06F 13/4086 |
| | | | 710/305 |
| 2016/0205767 A1* | 7/2016 | Subramanian | H05K 1/0213 |
| | | | 361/748 |
| 2018/0018294 A1* | 1/2018 | Park | G06F 13/409 |
| 2018/0165243 A1* | 6/2018 | Kim | G06F 13/1647 |
| 2019/0373714 A1* | 12/2019 | Paek | H05K 1/0248 |

* cited by examiner

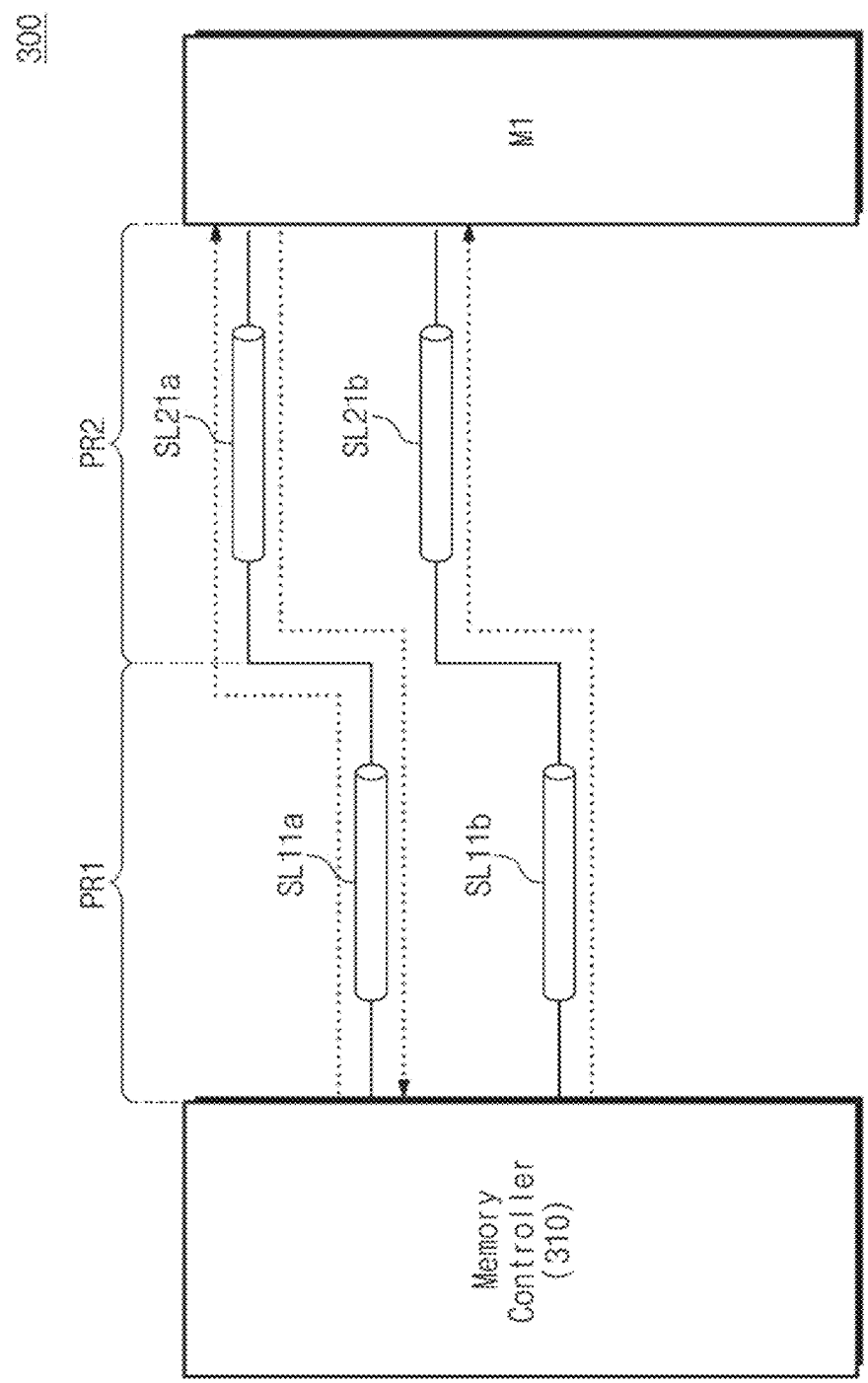

ELECTRIC DEVICE INCLUDING BRANCHED SIGNAL LINES, AND ELECTRIC DEVICE INCLUDING PRINTED CIRCUIT BOARD

CROSS-REFERENCE TO RELATED APPLICATIONS

This application claims priority under 35 U.S.C. § 119 to Korean Patent Application No. 10-2021-0081960 filed on Jun. 24, 2021, in the Korean Intellectual Property Office, the disclosures of which are incorporated by reference herein in their entireties.

BACKGROUND

Embodiments of the present disclosure described herein relate to semiconductor memories, and more particularly, relate to electronic devices, and electronic devices including a printed circuit board.

A semiconductor memory device is classified as a volatile memory device, in which stored data disappear when a power supply is turned off, such as a static random access memory (SRAM) or a dynamic random access memory (DRAM), or a nonvolatile memory device, in which stored data are retained even when a power supply is turned off, such as a flash memory device, a phase-change RAM (PRAM), a magnetic RAM (MRAM), a resistive RAM (RRAM), or a ferroelectric RAM (FRAM).

An electronic device that is based on a flash memory operates based on an electrical signal. For example, a controller and memory devices, which are included in the electronic device, communicate with each other through various signal lines. To improve the reliability of the electronic device, there are being developed various techniques for maintaining the reliability of signal. However, nowadays, as an operating speed of the electronic device increases and the degree of integration of the electronic device is improved, it is difficult to maintain the reliability of signal by using existing techniques.

SUMMARY

Embodiments of the present disclosure provide electronic devices with improved reliability and electronic devices including a printed circuit board.

According to some example embodiments, an electronic device includes a first memory device, a second memory device, a third memory device, and a fourth memory device, a memory controller that controls the first to fourth memory devices, a first signal line that makes electrical connection between the memory controller and a first branch point, a second signal line that makes electrical connection between the first branch point and a second branch point, a third signal line that makes electrical connection between the first branch point and a third branch point, a fourth signal line that electrically connects the second branch point and the first memory device, a fifth signal line that electrically connects the second branch point and the second memory device, a sixth signal line that electrically connects the third branch point and the third memory device, a seventh signal line that electrically connects the third branch point and the fourth memory device, and a stub that includes a first end electrically connected with at least one of the first to seventh signal lines, and a second end being left open-circuit without connection with any other electrical path.

According to some example embodiments, an electronic device includes a first memory device, a second memory device, a third memory device, and a fourth memory device, a memory controller that controls the first to fourth memory devices, a first signal line that makes electrical connection between the memory controller and a first branch point, a second signal line that makes electrical connection between the first branch point and a second branch point, a third signal line that makes electrical connection between the first branch point and a third branch point, a fourth signal line that electrically connects the second branch point and the first memory device, a fifth signal line that electrically connects the second branch point and the second memory device, a sixth signal line that electrically connects the third branch point and the third memory device, and a seventh signal line that electrically connects the third branch point and the fourth memory device, and a ratio of a length of the first signal line to a length of each of the second and third signal lines is 3/7 to 7/3.

According to some example embodiments, an electronic device includes a first memory device and a second memory device, a memory controller that controls the first and second memory devices, a first signal line that makes electrical connection between the memory controller and a first branch point, a second signal line that electrically connects the first branch point and the first memory device, and a third signal line that electrically connects the first branch point and the second memory device. A ratio of a length of the first signal line to a length of each of the second and third signal lines is 3/7 to 7/3.

According to some example embodiments, an electronic device includes a printed circuit board that includes a top surface and a bottom surface, a memory controller that is mounted on the top surface, a first memory device and a second memory device that are mounted on the top surface, a third memory device that is mounted on the bottom surface to face the first memory device, and a fourth memory device that is mounted on the bottom surface to face the third memory device. The printed circuit board includes a first branch point that is spaced from the memory controller as much as a first distance and is electrically connected with the memory controller, a second branch point that is spaced from the first branch point as much as a second distance and is electrically connected with the first branch point, the first memory device, and the third memory device, and a third branch point that is spaced from the first branch point as much as the second distance and is electrically connected with the first branch point, the second memory device, and the fourth memory device. A ratio of the first distance to the second distance is 3/7 to 7/3.

BRIEF DESCRIPTION OF THE FIGURES

The above and other objects and features of the present disclosure will become apparent by describing in detail embodiments thereof with reference to the accompanying drawings.

FIG. 11 is a block diagram illustrating a channel of FIG. 9A in more detail.

DETAILED DESCRIPTION

Below, embodiments of the present disclosure will be described in detail and clearly to such an extent that one skilled in the art easily carries out the present disclosure.

Figure 1:
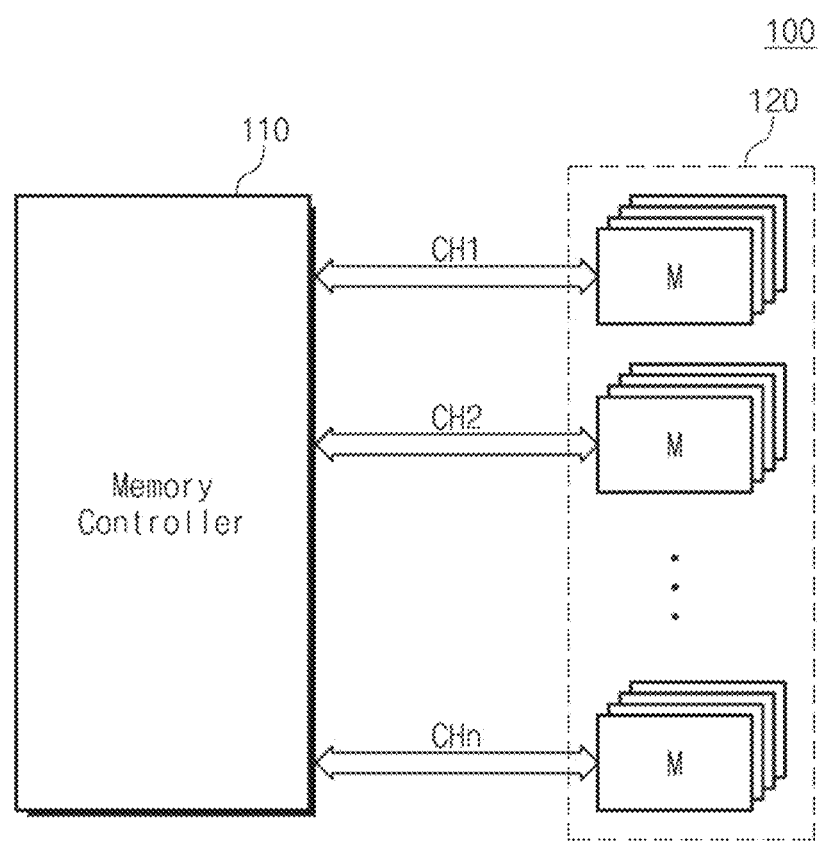
FIG. 1 is a block diagram illustrating an electronic device according to some example embodiments of the present disclosure.

FIG. 1 is a block diagram illustrating an electronic device according to some example embodiments of the present disclosure. Referring to FIG. 1, an electronic device 100 may include a memory controller 110 and a plurality of memory devices 120.

The memory controller 110 may control the plurality of memory devices 120. For example, the memory controller 110 may control the plurality of memory devices 120 through a plurality of channels CH1 to CHn, respectively.

The plurality of memory devices 120 may operate based on signals received from the memory controller 110 through the plurality of channels CH1 to CHn. For example, under control of the memory controller 110, the plurality of memory devices 120 may store data received through the plurality of channels CH1 to CHn or may send data stored therein to the memory controller 110 through the plurality of channels CH1 to CHn.

In some example embodiments, the plurality of memory devices 120 may be respectively implemented with NAND flash memory chips or may be implemented with a multi-chip package including a plurality of NAND flash memory chips, but the present disclosure is not limited thereto. Each of the plurality of memory devices 120 may include one of various memory devices such as a static RAM (SRAM), a dynamic RAM (DRAM), a synchronous DRAM (SDRAM), a phase-change RAM (PRAM), a magnetic RAM (MRAM), a resistive RAM (RRAM), and a ferroelectric RAM (FRAM).

In some example embodiments, at least two or more memory devices may communicate with the memory controller 110 through one channel (e.g., the first channel CH1). That is, the electronic device 100 may have a multi-rank structure. For example, a signal to be sent to a first memory device connected with the first channel CH1 may be provided to the remaining memory devices connected with the first channel CH1. In this case, a reflection signal coming from the remaining memory devices may be introduced into the first memory device. In this case, a reflection signal coming from each branch point may be introduced into the first memory device. The reflection signal introduced to the first memory device may have an influence on the signal input to the first memory device. In this case, the first memory device may fail to receive a signal normally or may operate abnormally.

The electronic device 100 according to the present disclosure may reduce the influence of a reflection signal occurring between a plurality of memory devices connected with the same channel, by adjusting (e.g., extending or reducing) a length of a channel of a specific section between the memory controller 110 and the memory devices 120 or a length of a signal line of the specific section. A length of a signal line of the electronic device 100 according to the present disclosure will be described in more detail with reference to the following drawings.

The electronic device 100 according to the present disclosure may further include stubs between the memory controller 110 and the memory devices 120. For example, a stub may refer to a dummy signal line. A first end of a stub may be connected with a branch point or a specific point, and a second end of the stub may be left open-circuit without connection with any other electrical path. Alternatively, the first end of the stub may be connected with a signal line (or a first end of the signal line), and the second end of the stub may be left open-circuit without connection with any other electrical path. The influence of the reflection signal may decrease by further adding a stub. A stub of the electronic device 100 according to the present disclosure will be described in more detail with reference to the following drawings.

In some example embodiments, each of the plurality of memory devices 120 may be a memory package including a plurality of memory chips (or dies). In some example embodiments, as each of the plurality of memory devices 120 includes a plurality of memory chips (or dies), a high-capacity electronic device 100 may be implemented. Below, for convenience of description, the term "memory device" is used. However, the term "memory device" used herein may be used to indicate a memory package including a plurality of memory chips.

Figure 2:
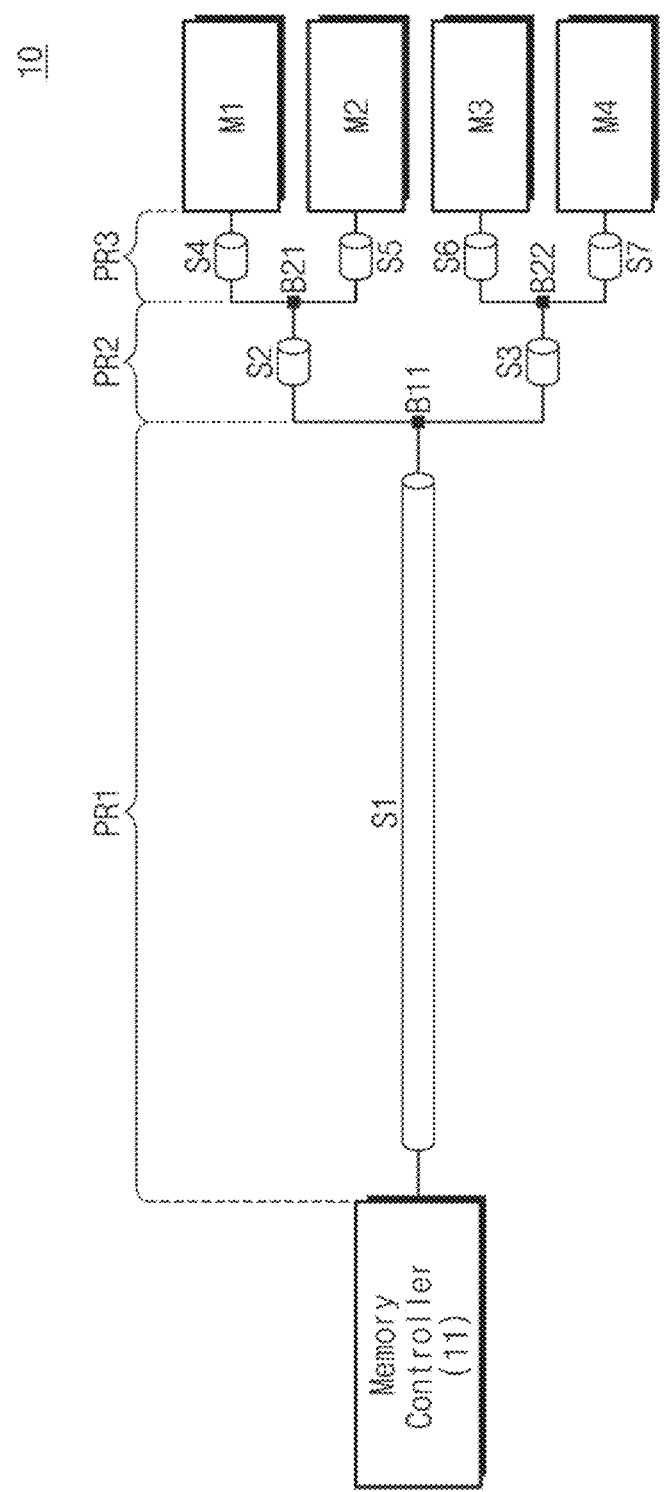
FIG. 2 is a block diagram for describing a signal flow between a memory controller and a memory device.

FIG. 2 is a block diagram for describing a signal flow between a memory controller and a memory device. Below, for convenience of description, example embodiments of the present disclosure will be described with reference to first to fourth memory devices M1 to M4 connected with the first channel CH1 and one signal line of a plurality of signal lines of the first channel CH1. However, the present disclosure is not limited thereto. For example, the first channel CH1 may further include a plurality of signal lines. Alternatively, a memory controller 11 may be further connected with any other memory devices through the first channel CH1.

Referring to FIG. 2, the memory controller 11 may be connected with the first to fourth memory devices M1 to M4 through signal lines S1 to S7 of the first channel CH1. In some example embodiments, the signal lines S1 to S7 of the first channel CH1 may indicate one signal line for transferring a data signal DQ or one of various control signals to at least one of the memory devices M1 to M4.

For example, one data signal DQ may be provided to the memory devices M1 to M4 through the signal lines S1 to S7. That is, the first to fourth memory devices M1 to M4 may be configured to receive the same signal from the memory controller 11 through the signal lines S1 to S7 of the first channel CH1. To this end, the signal lines S1 to S7 may be classified based on a plurality of sections PR1 to PR3.

The plurality of sections PR1 to PR3 may be classified based on branch points B11, B21, and B22. For example, the signal line S1 from the memory controller 11 to the first branch point B11 may be included in the first section PR1. The signal line S2 from the first branch point B11 to the second branch point B21 and the signal line S3 from the first branch point B11 to the third branch point B22 may be included in the second section PR2. The signal lines S4 and S5 from the second branch point B21 to the first and second memory devices M1 and M2 and the signal lines S6 and S7 from the third branch point B22 to the third and fourth memory devices M3 and M4 may be included in the third section PR3. That is, as a signal line is branched through the branch points B11, B21, and B22, the memory controller 11 and the first to fourth memory devices M1 to M4 may be electrically connected with each other.

In some example embodiments, the first section PR1 may include one signal line (i.e., S1). The second section PR2 may include two signal lines S2 and S3. The third section PR3 may include four signal lines S4, S5, S6, and S7. However, the present disclosure is not limited thereto. For example, the number of signal lines in each section may be changed depending on the number of memory devices connected with one channel.

In some example embodiments, in an electronic device 10, the first branch point B11 may be disposed adjacent to the memory devices M1 to M4. As such, a length from a first end to a second end of the signal line S1 of the first section PR1 may be longer than a length from a first end to a second end of the signal line S2 of the second section PR2.

In some example embodiments, the memory controller 11 may select a memory device, to which a signal is to be sent, by using a separate control signal (e.g., a chip select signal). For example, in the case where the memory controller 11 sends an input signal to the first memory device M1, the memory controller 11 may activate a chip select signal corresponding to the first memory device M1 and may send an input signal through the signal lines S1 to S7. In some example embodiments, chip select signals may be individually provided to the first to fourth memory devices M1 to M4 through separate signal lines different from each other.

In this case, because the same input signal is provided to the remaining memory devices M2 to M4, a reflective wave or a reflection signal may come from the remaining memory devices M2 to M4. For example, in the case where the memory controller 11 sends an input signal through the signal lines S1 to S7 for the purpose of sending the input signal to the first memory device M1, a reflection signal may be generated at an input terminal of the third memory device M3 due to impedance mismatching.

In some example embodiments, each of the memory devices M1 to M4 may include an on-die termination (ODT) resistor for impedance matching. The ODT resistor may prevent or reduce a reflection signal by making impedance matching between a signal line and the memory devices M1 to M4. However, in the case where an operating speed of the electronic device 100 is a specific speed or higher (e.g., in the case where the electronic device 100 performs a high-speed operation), it may be difficult to attenuate a reflection signal through a general ODT resistor.

Alternatively, a reflective wave or a reflection signal may come from each of the branch points B11, B21, and B22. For example, in the case where the memory controller 11 sends an input signal through the signal lines S1 to S7 for the purpose of sending the input signal to the first memory device M1, a reflection signal may be generated at the third branch point B22 due to impedance mismatching. The reflection signal may cause the distortion of signal. This may mean that the first memory device M1 fails to determine the input signal accurately.

For example, a reflection signal coming from the third memory device M3 may be introduced into the first memory device M1 through signal lines S6, S3, S2, and S4. Alternatively, a reflection signal coming from the third branch point B22 may be introduced into the first memory device M1 through signal lines S3, S2, and S4. That is, the first memory device M1 may receive the reflection signal coming from the third memory device M3 or the reflection signal coming from the third branch point B22, as well as the input signal sent from the memory controller 11. In this case, the first memory device M1 may fail to determine the input signal normally. The reflection signal may cause the distortion of signal. This may mean that the first memory device M1 fails to determine the input signal accurately.

Figure 3A:
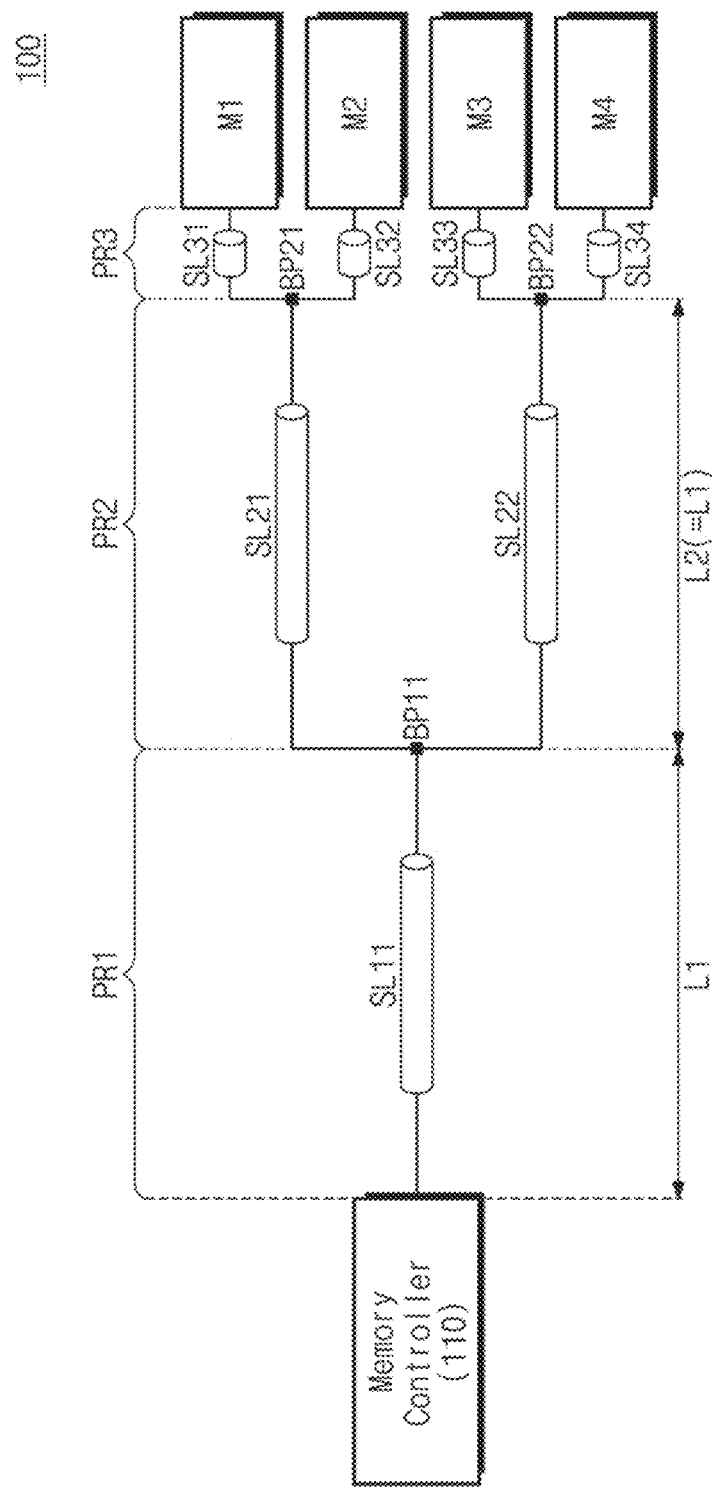
FIGS. 3A to 3C are block diagrams illustrating an electronic device according to some example embodiments of the present disclosure.
Figure 3B:
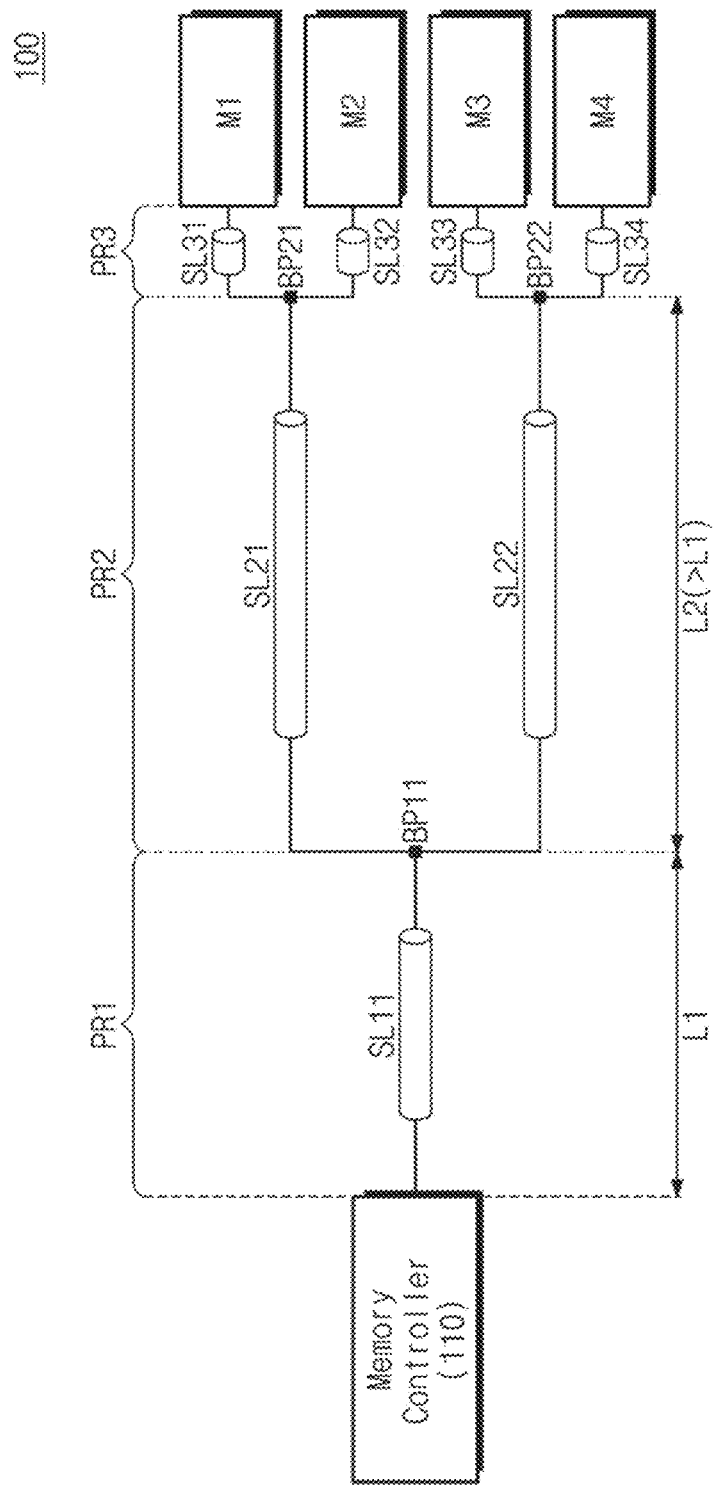
Figure 3C:
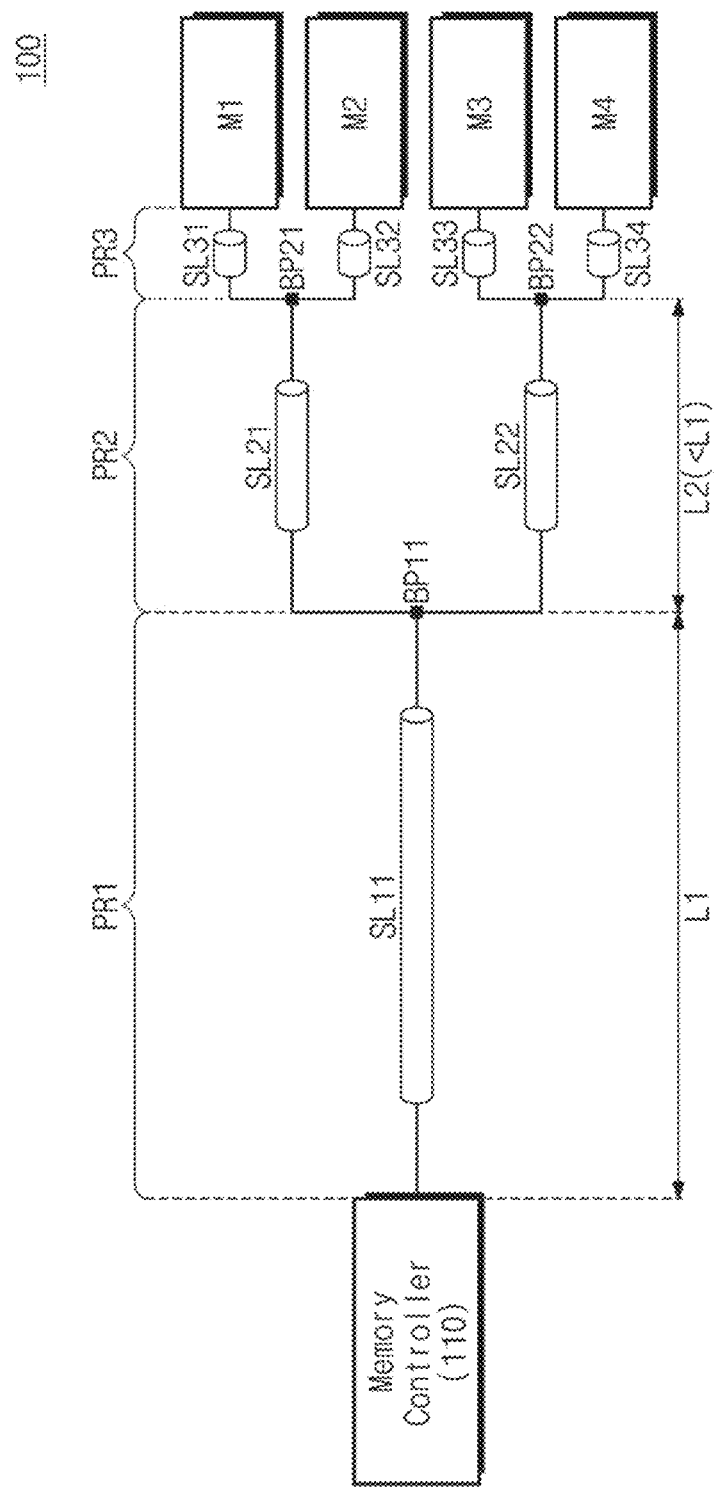

FIGS. 3A to 3C are block diagrams illustrating an electronic device according to some example embodiments of the present disclosure. Below, for convenience of description, additional description associated with the components described above will be omitted to avoid redundancy.

Referring to FIG. 3A, the electronic device 100 may include the memory controller 110 and the first to fourth memory devices M1 to M4. The memory controller 110 may be connected with the first to fourth memory devices M1 to M4 through signal lines SL11 SL21, SL22, SL31, SL32, SL33, and SL34 of the first channel CH1. As in the above description, the signal lines SL11 to SL34 of the first channel CH1 may be classified into the first to third sections PR1 to PR3 based on branch points BP11, BP21, and BP22. This is similar to that described above, and thus, additional description will be omitted to avoid redundancy.

To remove or reduce the influence of a reflection signal occurring between memory devices or a reflection signal coming from a branch point, the electronic device 100 according to the present disclosure may adjust a channel length of a specific section or a length of a signal line of a specific section. For example, unlike the example illustrated in FIG. 2, according to some example embodiments illustrated in FIG. 3A, a length (e.g., a first length L1) of the signal line SL11 in the first section PR1 may be equal to a length (e.g., a second length L2) of the signal lines SL21 and SL22 in the second section PR2. That is, the signal lines SL21 and SL22 of the second section PR2 may be extended.

For example, the first length L1 indicates a length from a first end to a second end of the signal line SL11 in the first section PR1. That is, the first length L1 may correspond to a distance from the memory controller 110 to the first branch point BP11. The second length L2 indicates a length from a first end to a second end of each of the signal lines SL21 and SL22 in the second section PR2. That is, the second length L2 may correspond to a distance from the first branch point BP11 to the second branch point BP21 or a distance from the first branch point BP11 to the third branch point BP22.

In other words, the length of the signal line SL11 of FIG. 3A may be shorter than the length of the signal line S1 of FIG. 2A. Alternatively, the length of the signal lines SL21 and SL22 of FIG. 3A may be longer than the length of the signal lines S2 and S3 of FIG. 2A.

In some example embodiments, compared to FIG. 2A, as the first length L1 decreases and the second length L2 increases, a ratio of the first length L1 to the second length L2 may be 1:1. The length of each of the signal lines SL21 and SL22 of the second section PR2 may be equal to the length of the signal line SL11 of the first section PR1 to such an extent as a reflection signal coming from the third or fourth memory device M3 or M4 or a reflection signal coming from the third branch point BP22 has little to no influence on an input signal transferred to the first or second memory device M1 or M2. Alternatively, the length of each of the signal lines SL21 and SL22 of the second section PR2 may be equal to the length of the signal line SL11 of the first section PR1 such as a reflection signal is attenuated to a specific level or lower. In this case, the specific level may be a signal level that allows a reflection signal coming from the third or fourth memory device M3 or M4 or the third branch point BP22 to have little to no influence on the input signal transferred to the first or second memory device M1 or M2.

As described above, a reflection signal coming from a branch point may be attenuated to the specific level or lower by making the first length L1 and the second length L2 equally. That is, as the reflection signal is attenuated to the specific level or lower, the influence of the reflection signal on an input signal provided to an activated memory device may decrease.

Unlike the example illustrated in FIG. 3A, referring to FIG. 3B, a length (e.g., the second length L2) of each of the signal lines SL21 and SL22 in the second section PR2 may be longer than a length (e.g., the first length L1) of the signal line SL11 in the first section PR1.

In other words, the length of the signal line SL11 of FIG. 3B may be shorter than the length of the signal line SL11 of FIG. 3A. Alternatively, the length of each of the signal lines SL21 and SL22 of FIG. 3B may be longer than the length of each of the signal lines SL21 and SL22 of FIG. 3A.

In some example embodiments, compared to FIG. 2A, as the first length L1 decreases and the second length L2 increases, a ratio of the first length L1 to the second length L2 may be 3/7. As such, the length of the signal lines SL21 and SL22 of the second section PR2 (or a signal line length of the second section PR2) may be extended such that reflection signals coming from the branch points BP21 and BP22 in the second section PR2 have little or no influence on an input signal transferred to the memory devices M1 to M4.

Unlike the example illustrated in FIG. 3A, referring to FIG. 3C, a length (e.g., the second length L2) of the signal lines SL21 and SL22 in the second section PR2 may be shorter than a length (e.g., the first length L1) of the signal line SL11 in the first section PR1.

In other words, the length of the signal line SL11 of FIG. 3C may be longer than the length of the signal line SL11 of FIG. 3A. Alternatively, the length of the signal lines SL21 and SL22 of FIG. 3C may be shorter than the length of the signal lines SL21 and SL22 of FIG. 3A.

In some example embodiments, compared to FIG. 2A, as the first length L1 decreases and the second length L2 increases, a ratio of the first length L1 to the second length L2 may be 7/3. As such, the length of the signal lines SL21 and SL22 of the second section PR2 (or a signal line length of the second section PR2) may be extended such that reflection signals coming from the branch points BP21 and BP22 in the second section PR2 have little to no influence on an input signal transferred to the memory devices M1 to M4.

As described above, compared to FIG. 2A, as the first length L1 decreases and the second length L2 increases, a ratio of the first length L1 to the second length L2 may be a given ratio. For example, a ratio of the first length L1 to the second length L2 may be about 3/7 to 7/3. Alternatively, the second length L2 may be about 0.43 to 2.33 times the first length L1. Accordingly, the influence of the reflection signal on an input signal may decrease.

Figure 4:
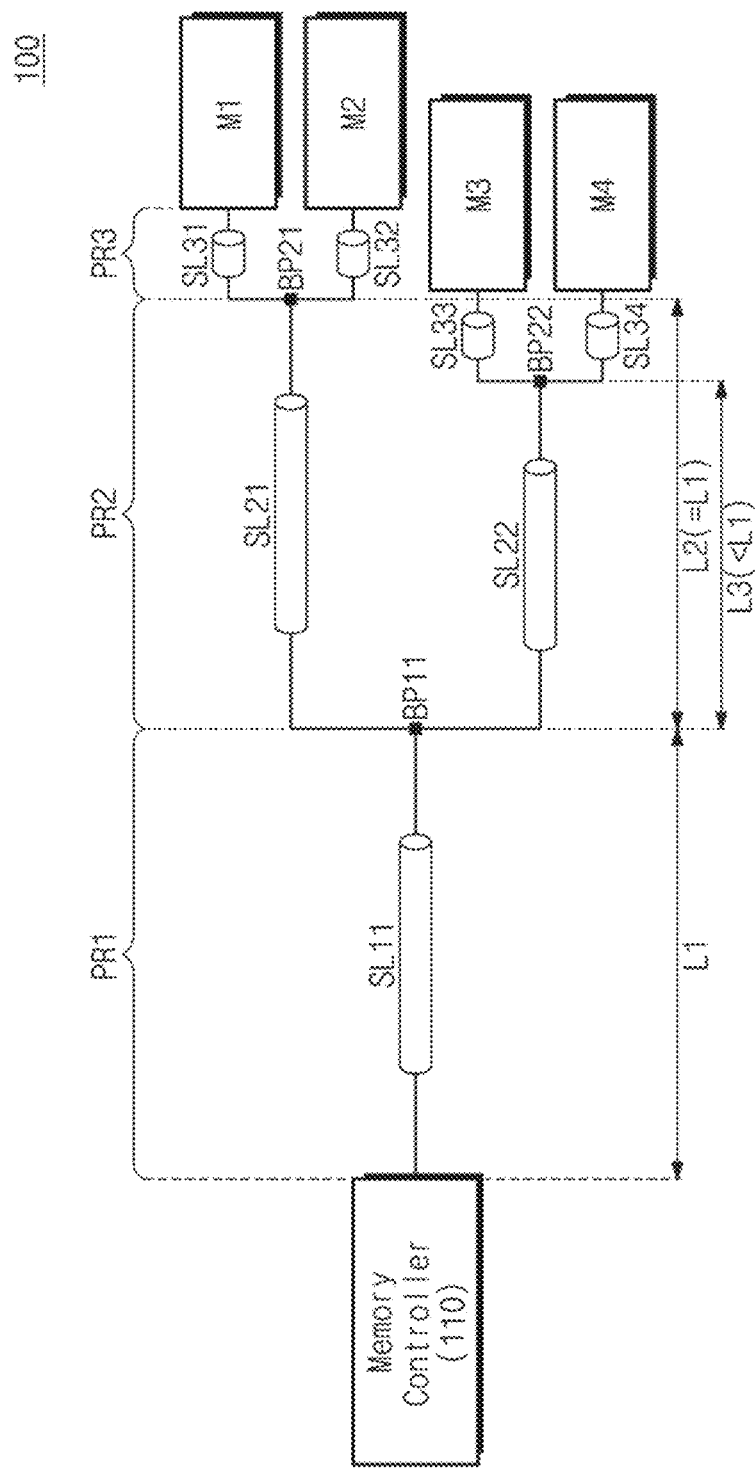
FIG. 4 is a block diagram illustrating an electronic device according to some example embodiments of the present disclosure.

FIG. 4 is a block diagram illustrating an electronic device according to some example embodiments of the present disclosure. Unlike the example illustrated in FIG. 3A, according to some example embodiments illustrated in FIG. 4, a length (e.g., the second length L2) of the first signal line SL21 of the second section PR2 and a length (e.g., a third length L3) of the second signal line SL22 of the second section PR2 may be different from each other.

In some example embodiments, the length L2 of the first signal line SL21 of the second section PR2 may be equal to a length (e.g., the first length L1) of the signal line SL11 of the first section PR1. The length (e.g., the third length L3) of the second signal line SL22 of the second section PR2 may be shorter than the length L1 of the signal line SL11 of the first section PR1. That is, lengths of signal lines included in the respective sections PR1, PR2, and PR3 may be equal to or different from each other.

In some example embodiments, even though the signal lines SL21 and SL22 of the second section PR2 have the same length, the signal line SL11 of the first section PR1 and each of the signal lines SL21 and SL22 of the second section PR2 may have a given ratio. For example, as described with reference to FIGS. 3A to 3C, a ratio of the length of the signal line SL11 of the first section PR1 to the length of each of the signal lines SL21 and SL22 of the second section PR2 may be 3/7 to 7/3.

An example embodiment in which the length of the first signal line SL21 of the second section PR2 is longer than the length of the second signal line SL22 of the second section PR2 is illustrated in FIG. 4, but the present disclosure is not limited thereto. The length of the first signal line SL21 of the second section PR2 may be shorter than the length of the second signal line SL22 of the second section PR2.

Figure 5A:
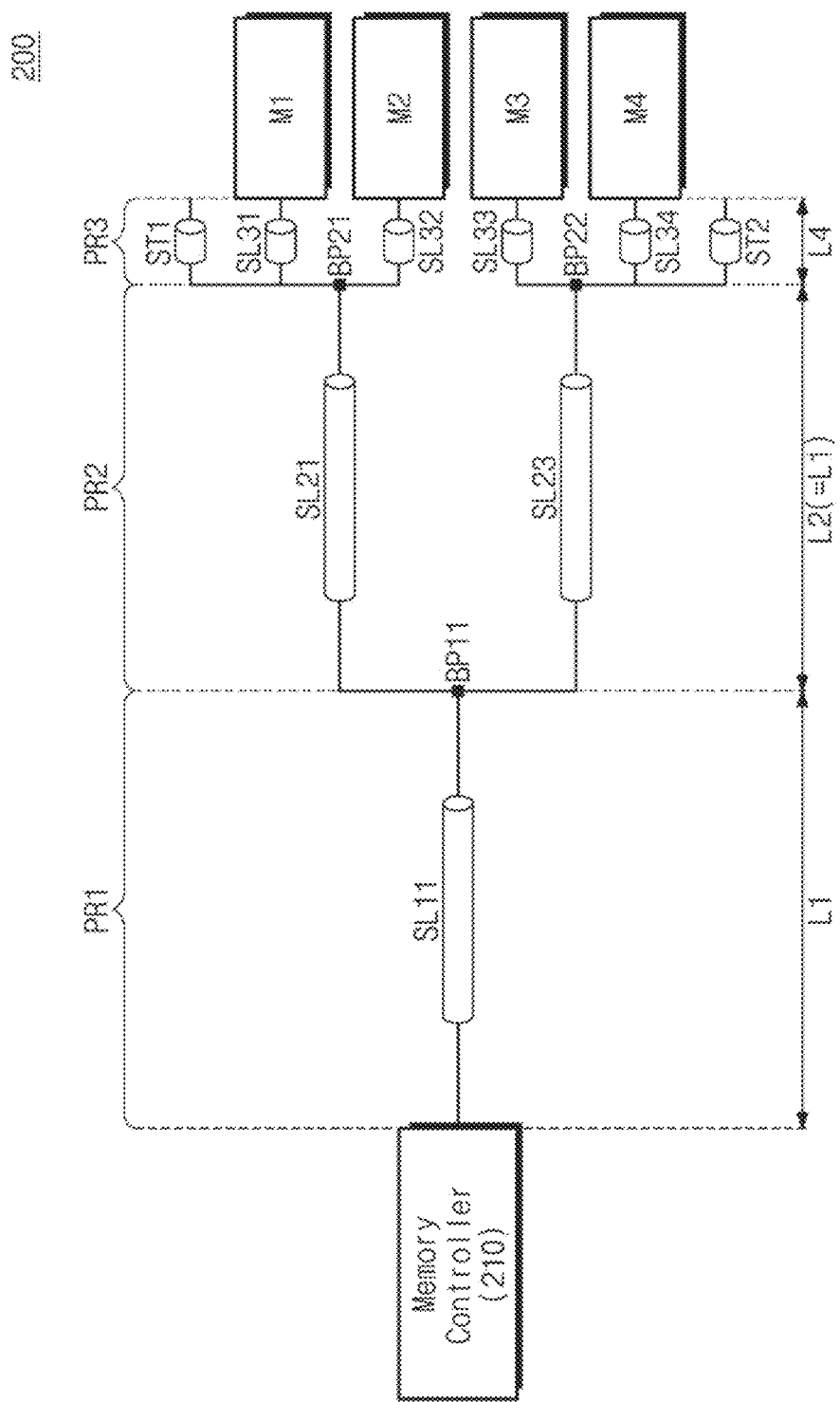
FIGS. 5A to 5C are block diagrams illustrating an electronic device according to some example embodiments of the present disclosure.
Figure 5B:
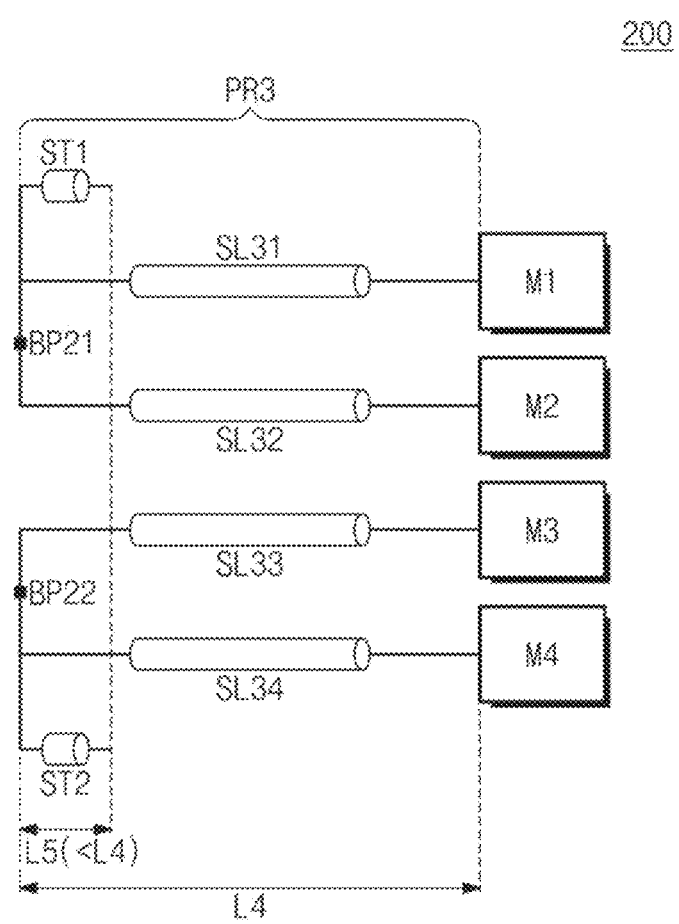
Figure 5C:
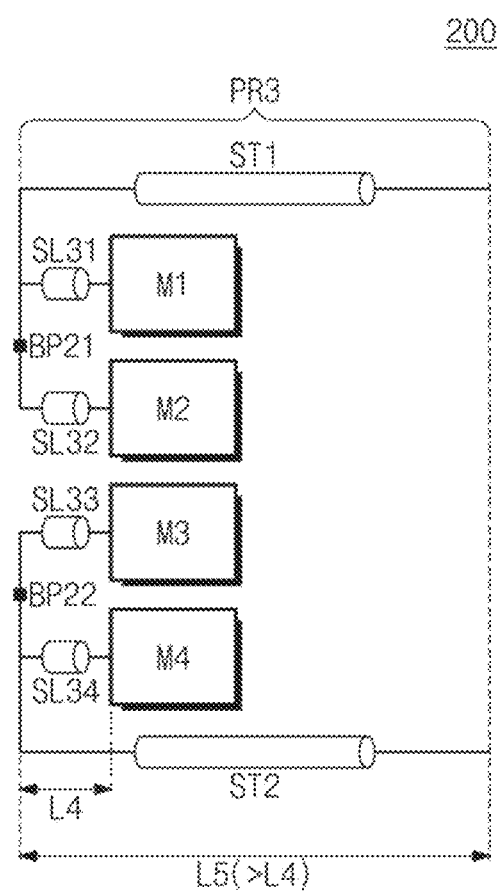

FIGS. 5A to 5C are block diagrams illustrating an electronic device according to some example embodiments of the present disclosure. Below, for convenience of description, additional description associated with the components described above will be omitted to avoid redundancy. Referring to FIG. 5A, an electronic device 200 may include a memory controller 210 and the first to fourth memory devices M1 to M4. The memory controller 210 may be connected with the first to fourth memory devices M1 to M4 through the signal lines SL11 SL21, SL22, SL31, SL32, SL33, and SL34 of the first channel CH1. As in the above description, the signal lines SL11 to SL34 of the first channel CH1 may be classified into first to third sections PR1 to PR3 based on the branch points BP11, BP21, and BP22. This is similar to that described above, and thus, additional description will be omitted to avoid redundancy.

In some example embodiments, a length of the signal lines SL31, SL32, SL33, and SL34 of the third section PR3 may be shorter than a length of signal lines SL11, SL21, and SL22 of the first and second sections PR1 and PR2. For example, the signal lines SL31, SL32, SL33, and SL34 of the third section PR3 may be micro signal lines.

The electronic device 200 may further include stubs ST1 and ST2. A first end of each of the stubs ST1 and ST2 may be connected with a corresponding branch point, and a second end thereof may be left open-circuit without connection with any other electrical path. For example, the first end of the first stub ST1 may be connected with the second branch point BP21, and the second end thereof may be left open-circuit without connection with any other electrical path. The first end of the second stub ST2 may be connected with the third branch point BP22, and the second end thereof may be left open-circuit without connection with any other electrical path. For example, a stub may refer to a dummy signal line.

A length from the first end to the second end of each of the stubs ST1 and ST2 may be equal to a length of the signal lines SL31 to SL34 of the third section PR3. A fourth length L4 indicates a distance or a length from a first end to a second end of each of the signal lines SL31 to SL34 in the third section PR3. That is, the fourth length L4 may correspond to a distance from the second branch point BP21 or the third branch point BP22 to the memory devices M1 to M4. A length of each of the stubs ST1 and ST2 may be equal to the fourth length L4.

As described above, the electronic device 200 may further include the stubs ST1 and ST2 at the branch points BP21 and BP22 to such an extent as a reflection signal has little to no influence on an input signal transferred to a memory device. Alternatively, the electronic device 200 may further include the stubs ST1 and ST2 at the branch points BP21 and BP22 to such an extent as a reflection signal is attenuated to the specific level or lower. As such, a signal reflected from an end of each of the stubs ST1 and ST2 may compensate for the distortion of signal due to the reflection signal. This may mean that a signal characteristic of an electronic device performing a high-speed operation is improved.

The electronic device 200 according to some example embodiments of the present disclosure may adjust a length of each of the stubs ST1 and ST2 to reduce the influence of the reflection signal. The length of each of the stubs ST1 and ST2 may be determined based on the length of the signal lines SL31 to SL34 of the third section PR3 such that the influence of the reflection signal is removed or reduced.

Referring to FIG. 5B, a length (e.g., a fifth length L5) of each of the stubs ST1 and ST2 may be different from a length (e.g., the fourth length L4) of the signal lines SL31 to SL34 of the third section PR3. The fifth length L5 indicates a distance or a length from a first end to a second end of each of the stubs ST1 and ST2.

In some example embodiments, the length from the first end to the second end of each of the stubs ST1 and ST2 may be shorter than a length from a first end to a second end of each of the signal lines SL31 to SL34 of the third section PR3. That is, the fifth length L5 may be shorter than the fourth length L4. For example, the length of the stubs ST1 and ST2 may be at least 0.1 times the length of the signal lines SL31 to SL34 of the third section PR3. Alternatively, the length of the stubs ST1 and ST2 may be at least 1 mm.

Referring to FIG. 5C, a length (e.g., the fifth length L5) of each of the stubs ST1 and ST2 may be different from a length (e.g., the fourth length L4) of the signal lines SL31 to SL34 of the third section PR3.

In some example embodiments, the length from the first end to the second end of each of the stubs ST1 and ST2 may be longer than a length from a first end to a second end of each of the signal lines SL31 to SL34 of the third section PR3. That is, the fifth length L5 may be longer than the fourth length L4. For example, the length of the stubs ST1 and ST2 may be up to 5 times the length of the signal lines SL31 to SL34 of the third section PR3.

As described above, the length of the stubs ST1 and ST2 may be adjusted to such an extent as a reflection signal has little to no influence on an input signal transferred to a memory device. Alternatively, the length of the stubs ST1 and ST2 may be adjusted based on the signal lines SL31 to SL34 of the third section PR3 such as a reflection signal is attenuated to the specific level or lower. The length of the stubs ST1 and ST2 may be equal to or different from the length of the signal lines SL31 to SL34 of the third section PR3. The length of the stubs ST1 and ST2 may be K times the length of the signal lines SL31 to SL34 of the third section PR3. In this case, "K" may be 0.1 to 5. Alternatively, the length of the stubs ST1 and ST2 may be 1 mm or more, and may be less than or equal to 5 times the length of the signal lines SL31 to SL34 of the third section PR3.

In some example embodiments, as illustrated in FIGS. 5A to 5C, the length of the first stub ST1 may be equal to the length of the second stub ST2. However, the present disclosure is not limited thereto. The length of the first stub ST1 and the length of the second stub ST2 may be different from each other.

In some example embodiments, as illustrated in FIGS. 5A to 5C, in the electronic device 200 including stubs, a length of the signal line SL11 of the first section PR1 and a length of the signal lines SL21 and SL22 of the second section PR2 may be equal. However, the present disclosure is not limited thereto. As described above, the length of the signal line SL11 of the first section PR1 and the length of the signal lines SL21 and SL22 of the second section PR2 may be equal or different. A ratio of the length of the signal line SL11 of the first section PR1 to the length of the signal lines SL21 and SL22 of the second section PR2 may be a given ratio. For example, the given ratio may be 3/7 to 7/3.

Figure 6:
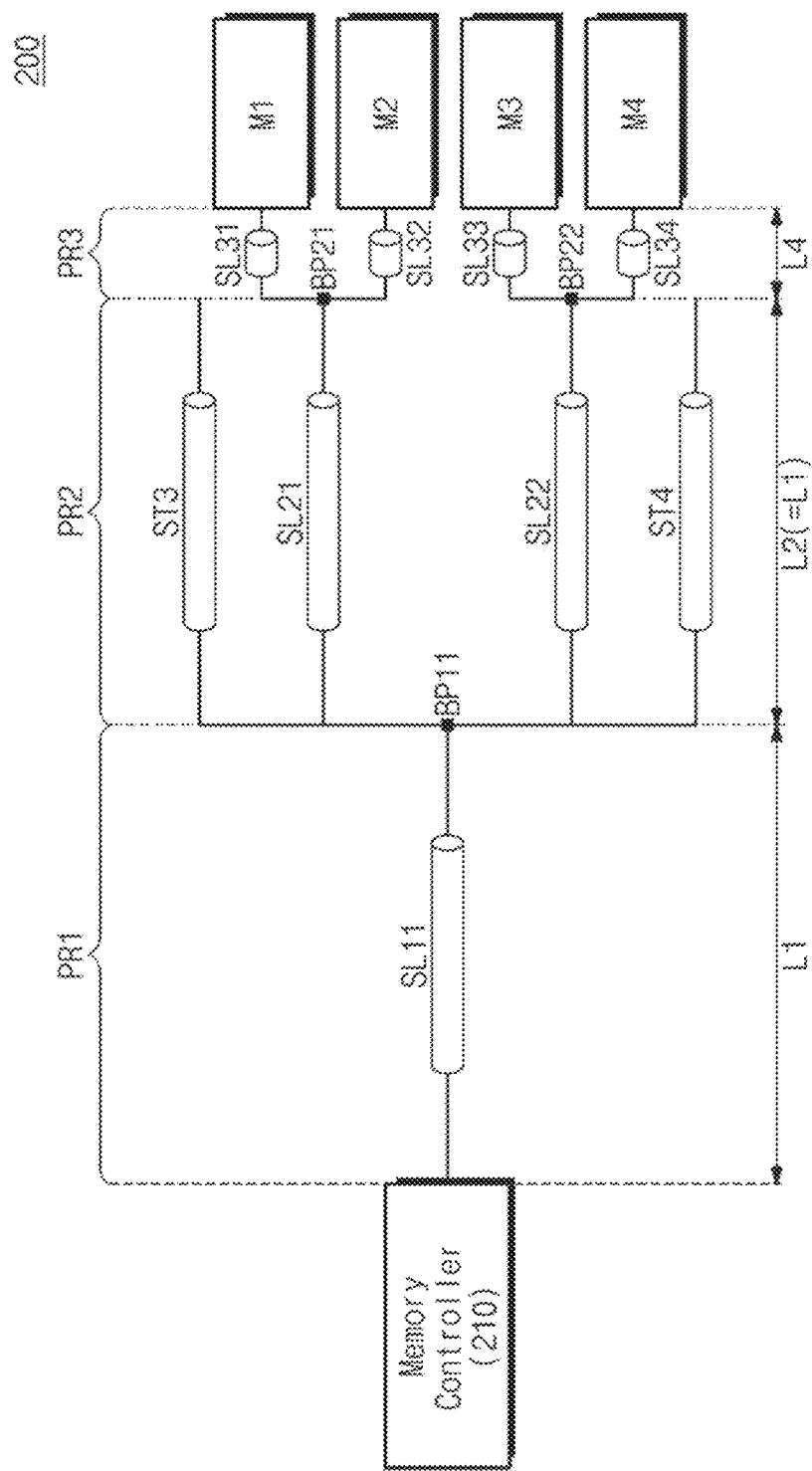
FIG. 6 is a block diagram illustrating an electronic device according to some example embodiments of the present disclosure.

FIG. 6 is a block diagram illustrating an electronic device according to some example embodiments of the present disclosure. Referring to FIG. 6, the electronic device 200 may include the memory controller 210 and the first to fourth memory devices M1 to M4. The memory controller 210 may be connected with the first to fourth memory devices M1 to M4 through the signal lines SL11 SL21, SL22, SL31, SL32, SL33, and SL34 of the first channel CH1. As in the above description, the signal lines SL11 to SL34 of the first channel CH1 may be classified into the first to third sections PR1 to PR3 based on the branch points BP11, BP21, and BP22. This is similar to that described above, and thus, additional description will be omitted to avoid redundancy.

The electronic device 200 may further include stubs ST3 and ST4. For example, a first end of the third stub ST3 may be connected with the first branch point BP11, and a second end thereof may be left open-circuit without connection with any other electrical path. A first end of the fourth stub ST4 may be connected with the first branch point BP11, and a second end thereof may be left open-circuit without connection with any other electrical path.

A length from the first end to the second end of each of the stubs ST3 and ST4 may be equal to a length of the signal lines SL21 and SL22 of the second section PR2. That is, the length of each of the stubs ST3 and ST4 may correspond to the length of the signal lines SL21 and SL22 of the second section PR2.

Unlike the example illustrated in FIG. 6, the length of the stubs ST3 and ST4 may be different from the length of the signal lines SL21 and SL22 of the second section PR2. The length of the stubs ST3 and ST4 may be shorter than the length of the signal lines SL21 and SL22 of the second section PR2. Alternatively, the length of the stubs ST3 and ST4 may be longer than the length of the signal lines SL21 and SL22 of the second section PR2. For example, the length of the stubs ST3 and ST4 may be K times the length of the signal lines SL21 and SL22 of the second section PR2. In this case, "K" may be 0.1 to 5. Alternatively, the length of the stubs ST3 and ST4 may be 1 mm or more, and may be less than or equal to 5 times the length of the signal lines SL21 and SL22 of the second section PR2.

In some example embodiments, the length of the third stub ST3 may be equal to the length of the fourth stub ST4. However, the present disclosure is not limited thereto. The length of the third stub ST3 and the length of the fourth stub ST4 may be different from each other.

In some example embodiments, in the electronic device 200 including stubs, the length of the signal line SL11 of the first section PR1 and the length of the signal lines SL21 and SL22 of the second section PR2 may be equal. However, the present disclosure is not limited thereto. As illustrated in FIGS. 2 to 4, the length of the signal line SL11 of the first section PR1 and the length of the signal lines SL21 and SL22 of the second section PR2 may be equal or different. A ratio of the length of the signal line SL11 of the first section PR1 to the length of each of the signal lines SL21 and SL22 of the second section PR2 may be 3/7 to 7/3.

Figure 7:
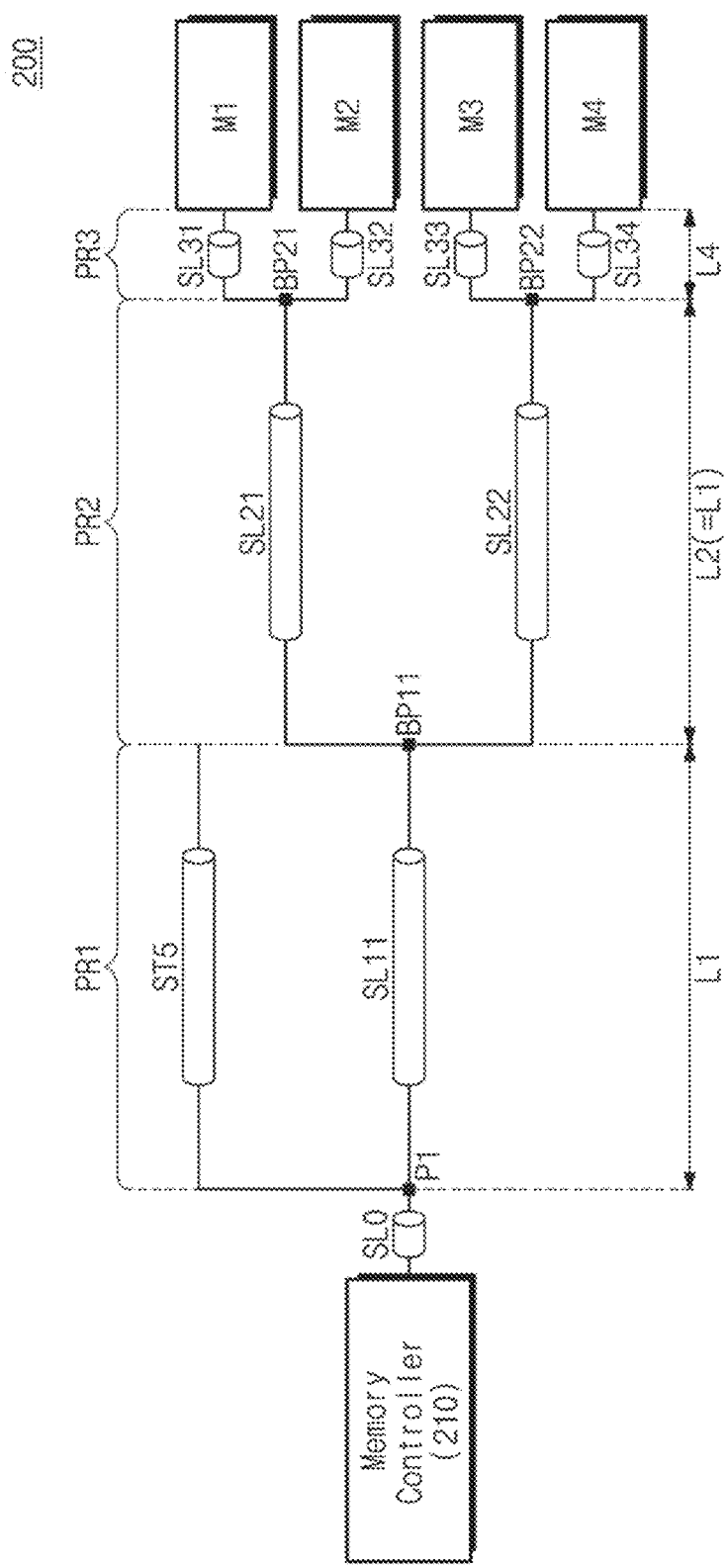
FIG. 7 is a block diagram illustrating an electronic device according to some example embodiments of the present disclosure.

FIG. 7 is a block diagram illustrating an electronic device according to some example embodiments of the present disclosure. Referring to FIG. 7, the electronic device 200 may include the memory controller 210 and the first to fourth memory devices M1 to M4. The memory controller 210 may be connected with the first to fourth memory devices M1 to M4 through the signal lines SL11 SL21, SL22, SL31, SL32, SL33, and SL34 of the first channel CH1. As in the above description, the signal lines SL11 to SL34 of the first channel CH1 may be classified into the first to third sections PR1 to PR3 based on the branch points BP11, BP21, and BP22. This is similar to that described above, and thus, additional description will be omitted to avoid redundancy.

Unlike the example illustrated in FIG. 5A, the electronic device 200 of FIG. 7 may further include a signal line SL0. The memory controller 210 may be connected with the first branch point BP11 through the signal line SL0 and the signal line SL11 of the first section PR1. A first end of the signal line SL0 may be connected with the memory controller 210, and a second end thereof may be connected with a first point P1. A first end of the signal line SL11 of the first section PR1 may be connected with the first point P1, and a second end thereof may be connected with the first branch point BP11. For example, a length of the signal line SL0 may be shorter than a length of the signal line SL11 of the first section PR1. The signal line SL0 may be a micro signal line.

The electronic device 200 may further include a stub ST5. For example, a first end of the stub ST5 may be connected with the first point P1, and a second end thereof may be left open-circuit without connection with any other electrical path.

A length from the first end to the second end of the stub ST5 may be equal to the length of the signal line SL11 of the first section PR1. That is, the length of the stub ST5 may correspond to the length of the signal line SL11 of the first section PR1.

Unlike the example illustrated in FIG. 7, the length of the stub ST5 may be different from the length of the signal line SL11 of the first section PR1. The length of the stub ST5 may be shorter than the length of the signal line SL11 of the first section PR1. Alternatively, the length of the stub ST5 may be longer than the length of the signal line SL11 of the first section PR1. For example, the length of stub ST5 may be K times the length of the signal line SL11 of the first section PR1. In this case, "K" may be 0.1 to 5. Alternatively, the length of the stub ST5 may be 1 mm or more, and may be less than or equal to 5 times the length of the signal line SL11 of the first section PR1.

In some example embodiments, in the electronic device 200 including stubs, the length of the signal line SL11 of the first section PR1 and the length of the signal lines SL21 and SL22 of the second section PR2 may be equal. However, the present disclosure is not limited thereto. As illustrated in FIGS. 2 to 4, the length of the signal line SL11 of the first section PR1 and the length of the signal lines SL21 and SL22 of the second section PR2 may be equal or different. A ratio of the length of the signal line SL11 of the first section PR1 to the length of each of the signal lines SL21 and SL22 of the second section PR2 may be 3/7 to 7/3.

Figure 8A:
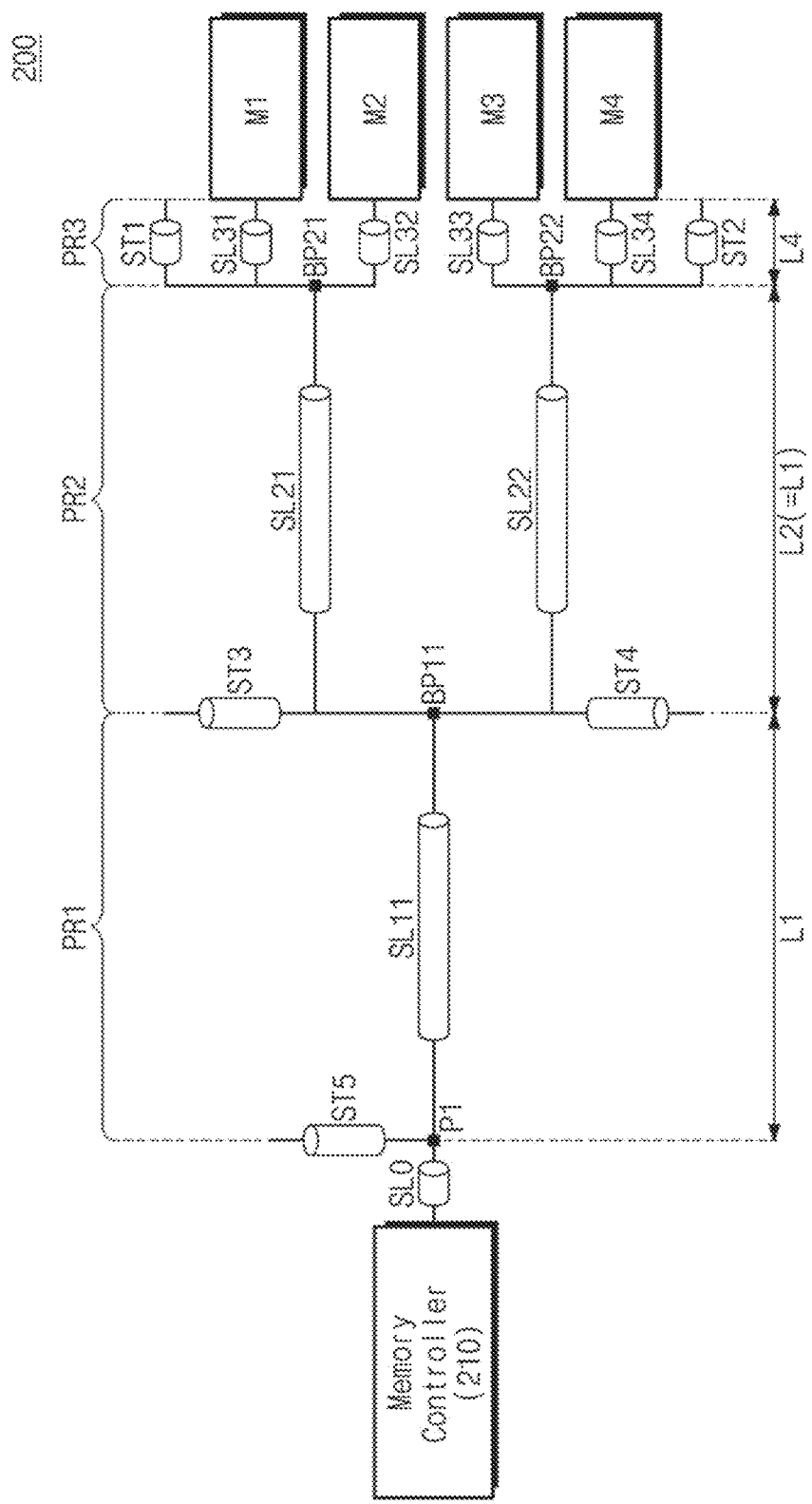
FIGS. 8A and 8B are block diagrams illustrating an electronic device according to some example embodiments of the present disclosure.
Figure 8B:
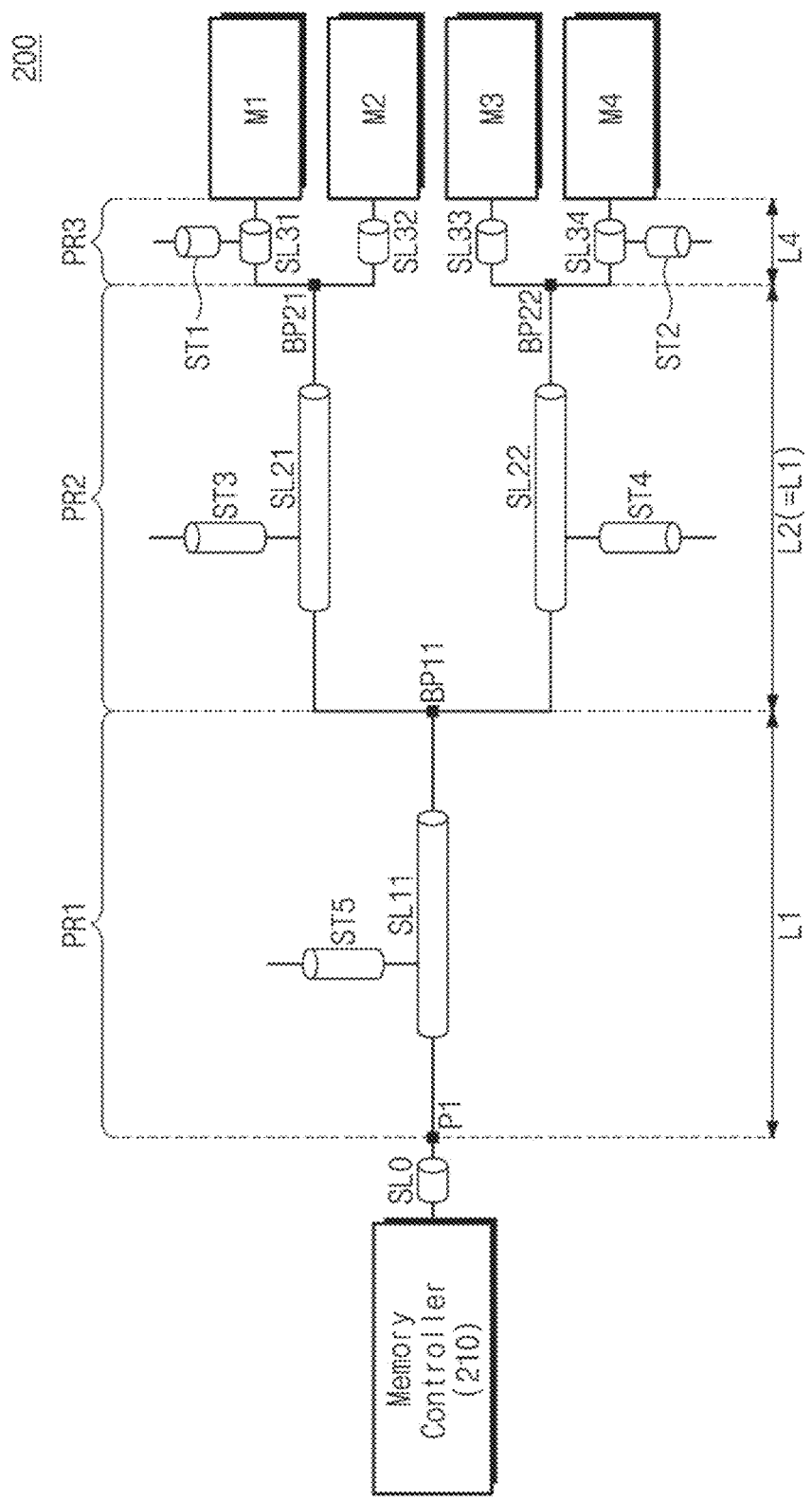

FIGS. 8A and 8B are block diagrams illustrating an electronic device according to some example embodiments of the present disclosure. Referring to FIGS. 8A and 8B, the electronic device 200 may include the memory controller 210 and the first to fourth memory devices M1 to M4. The memory controller 210 may be connected with the first to fourth memory devices M1 to M4 through signal lines SL0, SL11 SL21, SL22, SL31, SL32, SL33, and SL34 of the first channel CH1. As in the above description, the signal lines SL11 to SL34 of the first channel CH1 may be classified into the first to third sections PR1 to PR3 based on the branch points BP11, BP21, and BP22. This is similar to that described above, and thus, additional description will be omitted to avoid redundancy.

The electronic device 200 may further include stubs ST1 to ST5. For example, a first end of the first stub ST1 may be connected with the second branch point BP21, and a second end thereof may be left open-circuit without connection with any other electrical path. A first end of the second stub ST2 may be connected with the third branch point BP22, and a second end thereof may be left open-circuit without connection with any other electrical path. A first end of the third stub ST3 may be connected with the first branch point BP11, and a second end thereof may be left open-circuit without connection with any other electrical path. A first end of the fourth stub ST4 may be connected with the first branch point BP11, and a second end thereof may be left open-circuit without connection with any other electrical path. A first end of the fifth stub ST5 may be connected between the signal line SL0 and the signal line SL11 of the first section PR1 (e.g., with a first point P1), and a second end thereof may be left open-circuit without connection with any other electrical path.

A length of each of the stubs ST1 to ST5 may be equal to or different from a length of a corresponding signal line(s). The length of each of the stubs ST1 to ST5 may be shorter or longer than the length of the corresponding signal line(s). For example, the length of each of the stubs ST1 to ST5 may be K times the length of the corresponding signal line(s). In this case, "K" may be 0.1 to 5. Alternatively, the length of each of the stubs ST1 to ST5 may be 1 mm or more, and may be less than or equal to 5 times the length of the corresponding signal line(s). The corresponding signal line(s) of each of the stubs ST1 to ST5 may indicate a signal line connected with a point or a branch point connected with one end of each of the stubs ST1 to ST5. For example, the signal line corresponding to the first stub ST1 may include the signal lines SL31 and SL32 connected with the second branch point BP21 connected with the first stub ST1.

The electronic device 200 of FIG. 8A may include the first to fifth stubs ST1 to ST5. However, the present disclosure is not limited thereto. For example, unlike the example illustrated in FIG. 8A, the electronic device 200 may include at least one of the first to fifth stubs ST1 to ST5. For example, the electronic device 200 may include the first and fourth stubs ST1 and ST4 only.

The electronic device 200 of FIG. 8B may include the stubs ST1 to ST5. Unlike FIG. 8A, the stubs ST1 to ST5 of FIG. 8B may be connected with any other place except for a branch point or a point between signal lines. For example, each of the stubs ST1 to ST5 may be connected between a first end and a second end of a corresponding signal line. That is, each of the stubs ST1 to ST5 may be connected with a middle part of the corresponding signal line.

For example, a first end of the first stub ST1 may be connected between a first end and a second end of the signal line SL31, not the second branch point BP21, and a second end of the first stub ST1 may be left open-circuit without connection with any other electrical path. A first end of the second stub ST2 may be connected between a first end and a second end of the signal line SL34, not the third branch point BP22, and a second end of the second stub ST2 may be left open-circuit without connection with any other electrical path. A first end of the third stub ST3 may be connected between a first end and a second end of the signal line SL21, not the first branch point BP11, and a second end of the third stub ST3 may be left open-circuit without connection with any other electrical path. A first end of the fourth stub ST4 may be connected between a first end and a second end of the signal line SL22, not the first branch point BP11, and a second end of the fourth stub ST4 may be left open-circuit without connection with any other electrical path. A first end of the fifth stub ST5 may be connected between a first end and a second end of the signal line SL11, not the first point P1, and a second end of the fifth stub ST5 may be left open-circuit without connection with any other electrical path.

A length of each of the stubs ST1 to ST5 may be equal to or different from a length of a corresponding signal line. The length of each of the stubs ST1 to ST5 may be shorter or longer than the length of the corresponding signal line. For example, the length of each of the stubs ST1 to ST5 may be K times the length of the corresponding signal line. In this case, "K" may be 0.1 to 5. Alternatively, the length of each of the stubs ST1 to ST5 may be 1 mm or more, and may be less than or equal to 5 times the length of the corresponding signal line. The corresponding signal line of each of the stubs ST1 to ST5 may indicate a signal line connected with a point or a branch point connected with one end of each of the stubs ST1 to ST5. For example, the signal line corresponding to the first stub ST1 may include the signal lines SL31 and SL32 connected with the second branch point BP21 connected with the first stub ST1.

The electronic device 200 of FIG. 8B may include the first to fifth stubs ST1 to ST5. However, the present disclosure is not limited thereto. For example, unlike the example illustrated in FIG. 8B, the electronic device 200 may include at least one of the first to fifth stubs ST1 to ST5. For example, the electronic device 200 may include the first and fourth stubs ST1 and ST4 only.

In the electronic device 200 of FIGS. 8A and 8B, the length of the signal line SL11 of the first section PR1 and the length of the signal lines SL21 and SL22 of the second section PR2 may be equal. However, the present disclosure is not limited thereto. As illustrated in FIGS. 2 to 4, the length of the signal line SL11 of the first section PR1 and the length of the signal lines SL21 and SL22 of the second section PR2 may be equal or different. A ratio of the length of the signal line SL11 of the first section PR1 to the length of the signal lines SL21 and SL22 of the second section PR2 may be 3/7 to 7/3.

As described above, as stubs (e.g., dummy lines) are added to branch points or points and as lengths of the stubs, the number of stubs, and directions of the stubs are adjusted, the electronic device 200 may remove or reduce the influence of the reflection signal. That is the stubs may be oriented parallel to, perpendicular to, or at another orientation to the signal lines.

Figure 9A:
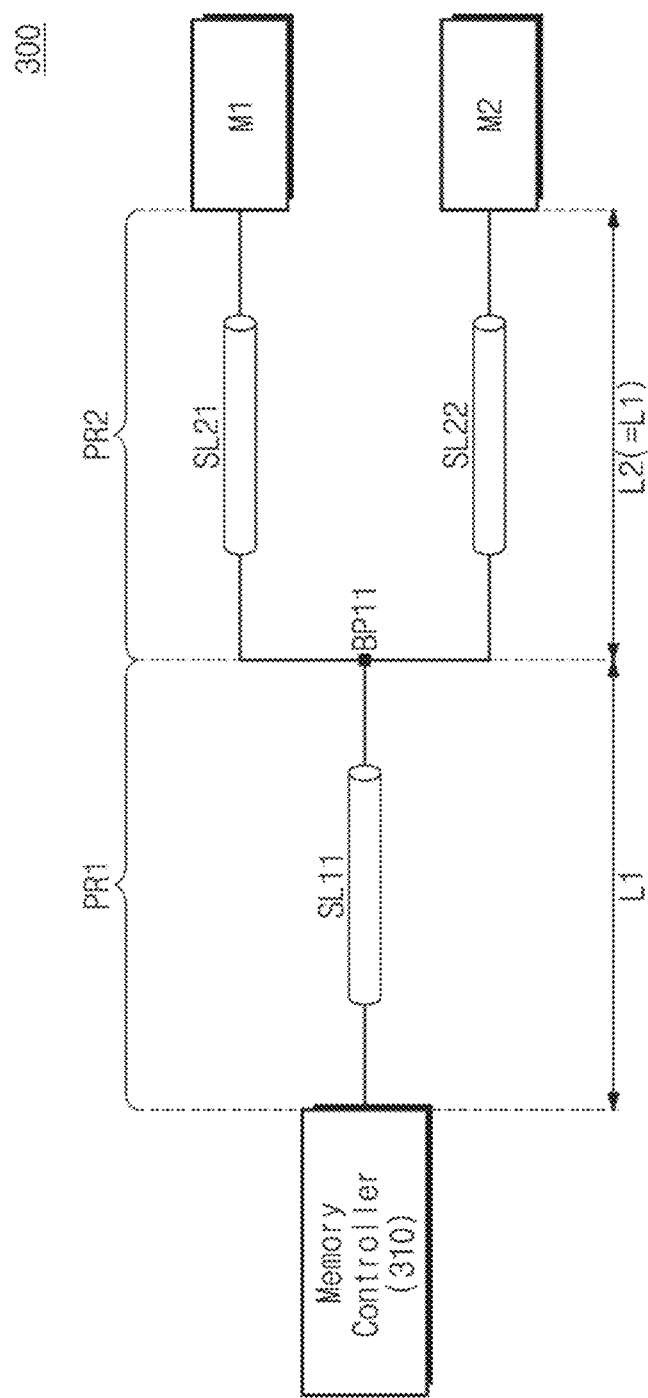
FIGS. 9A to 9C are block diagrams illustrating an electronic device according to some example embodiments of the present disclosure.
Figure 9B:
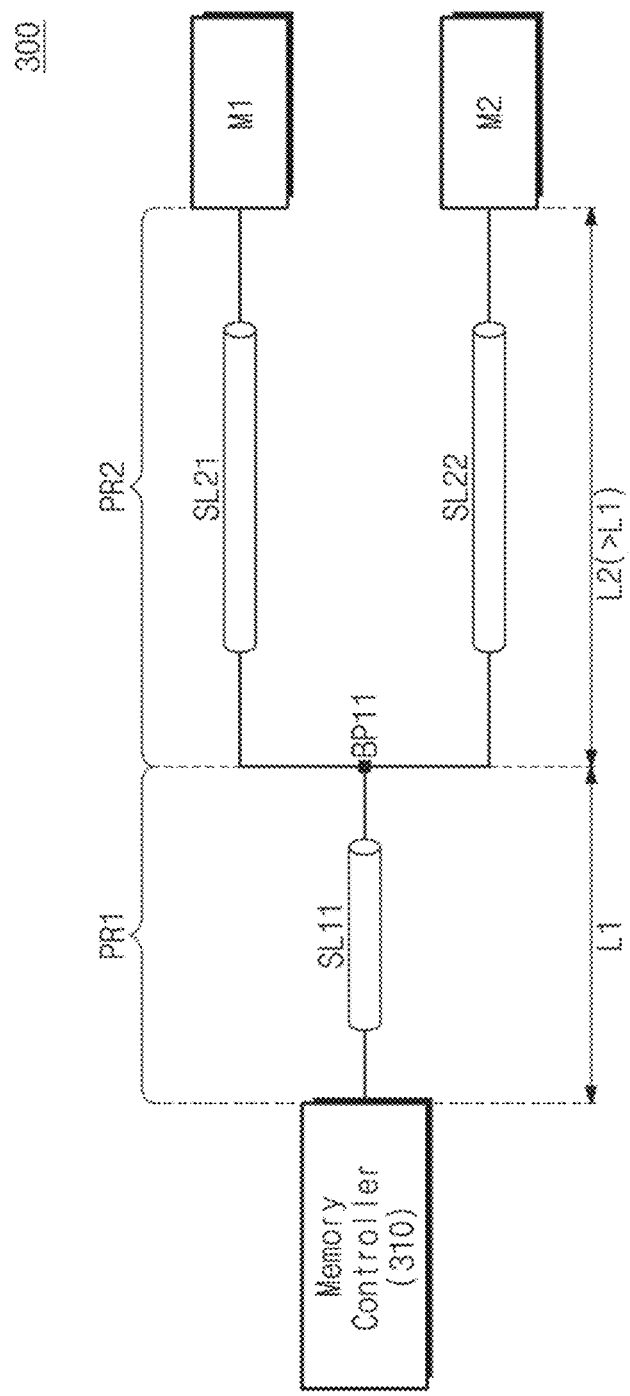
Figure 9C:
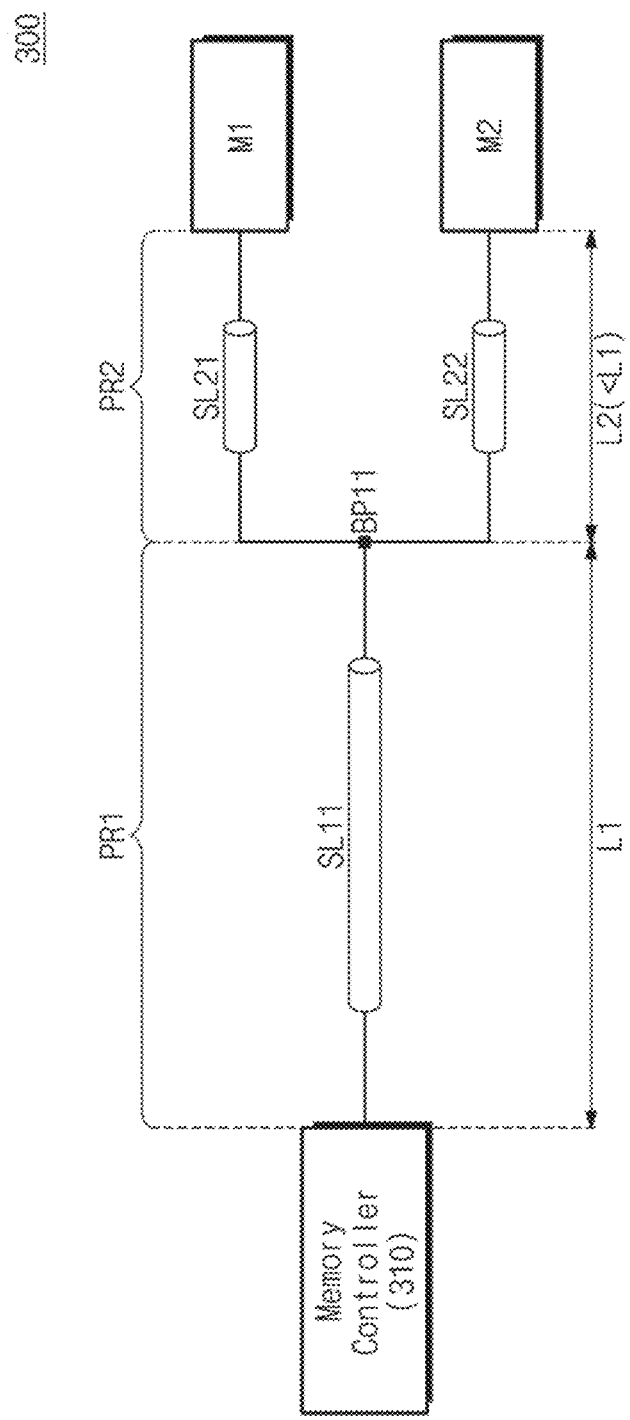

FIGS. 9A to 9C are block diagrams illustrating an electronic device according to some example embodiments of the present disclosure. Referring to FIG. 9A, an electronic device 300 may include a memory controller 310 and first and second memory devices M1 and M2. The memory controller 310 may be connected with the first and second memory devices M1 and M2 through signal lines SL11, SL21, and SL22 of the first channel CH1.

The signal lines SL11, SL21, and SL22 of the first channel CH1 may be classified into first and second sections PR1 and PR2 based on a branch point BP11. For example, the signal line SL11 from the memory controller 310 to the branch point BP11 may be included in the first section PR1. The signal lines SL21 and SL22 from the branch point BP11 to the first and second memory devices M1 and M2 may be included in the second section PR2. That is, as a signal line is branched through the branch point BP11, the memory controller 310 and the first and second memory devices M1 and M2 may be electrically connected with each other.

In some example embodiments, the first section PR1 may include one signal line (i.e., SL11). The second section PR2 may include two signal lines (i.e., SL21 and SL22). However, the present disclosure is not limited thereto. For example, the number of signal lines in each section may be changed depending on the number of memory devices connected with one channel.

To remove or reduce the influence of the reflection signal occurring between memory devices or the reflection signal coming from a branch point, the electronic device 300 according to the present disclosure may adjust a channel length of a specific section or a length of a signal line of the specific section. For example, according to some example embodiments illustrated in FIG. 9A, a length (e.g., a first length L1) of the signal line SL11 in the first section PR1 may be equal to a length (e.g., a second length L2) of the signal lines SL21 and SL22 in the second section PR2.

For example, the first length L1 indicates a length from a first end to a second end of the signal line SL11 in the first section PR1. That is, the first length L1 may correspond to a distance from the memory controller 310 to the branch point BP11. The second length L2 indicates a length from a first end to a second end of each of the signal lines SL21 and SL22 in the second section PR2. That is, the second length L2 may correspond to a distance from the branch point BP11 to the first memory device M1 or a distance from the branch point BP11 to the second memory device M2.

As described above, a ratio of the length of the signal line SL11 of the first section PR1 to the length of the signal lines SL21 and SL22 of the second section PR2 may be 1:1. As such, a reflection signal coming from the second memory device M2 may be attenuated to such an extent as to have little to no influence of the reflection signal on an input signal transferred to the first memory device M1.

Unlike the example illustrated in FIG. 9A, referring to FIG. 9B, a length (e.g., the second length L2) of the signal lines SL21 and SL22 in the second section PR2 may be longer than a length (e.g., the first length L1) of the signal line SL11 in the first section PR1.

In other words, the length of the signal line SL11 of FIG. 9B may be shorter than the length of the signal line SL11 of FIG. 9A. Alternatively, the length of the signal lines SL21 and SL22 of FIG. 9B may be longer than the length of the signal lines SL21 and SL22 of FIG. 9A.

In some example embodiments, a ratio of the first length L1 to the second length L2 may be 3/7. That is, the length L2 of the signal lines SL21 and SL22 of the second section PR2 may be I times the length L1 of the signal line SL11 of the first section PR1. Here, "I" may be "1" or more and may be "2.33" or less.

Unlike the example illustrated in FIG. 9A, referring to FIG. 9C, a length (e.g., the second length L2) of the signal lines SL21 and SL22 in the second section PR2 may be shorter than a length (e.g., the first length L1) of the signal line SL11 in the first section PR1.

In other words, the length of the signal line SL11 of FIG. 9C may be longer than the length of the signal line SL11 of FIG. 9A. Alternatively, the length of the signal lines SL21 and SL22 of FIG. 9C may be shorter than the length of the signal lines SL21 and SL22 of FIG. 9A.

In some example embodiments, a ratio of the first length L1 to the second length L2 may be 7/3. That is, the length L2 of the signal lines SL21 and SL22 of the second section PR2 may be m times the length L1 of the signal line SL11 of the first section PR1. Here, "m" may be "0.42" or more and may be "1" or less.

As illustrated in FIGS. 9A to 9C, the length of the first signal line SL21 of the second section PR2 may be equal to the length of the second signal line SL22 of the second section PR2. However, the present disclosure is not limited thereto. Although not illustrated in FIGS. 9A to 9C, the length of the first signal line SL21 of the second section PR2 may be different from the length of the second signal line SL22 of the second section PR2.

As described above, the first length L1 and the second length L2 may have a given ratio. For example, a ratio of the first length L1 to the second length L2 may be about 3/7 to 7/3. Alternatively, the second length L2 may be K times the first length L1. Here, "K" may be "0.42" or more and may be "2.33" or less. As such, the influence of the reflection signal may decrease.

Figure 10A:
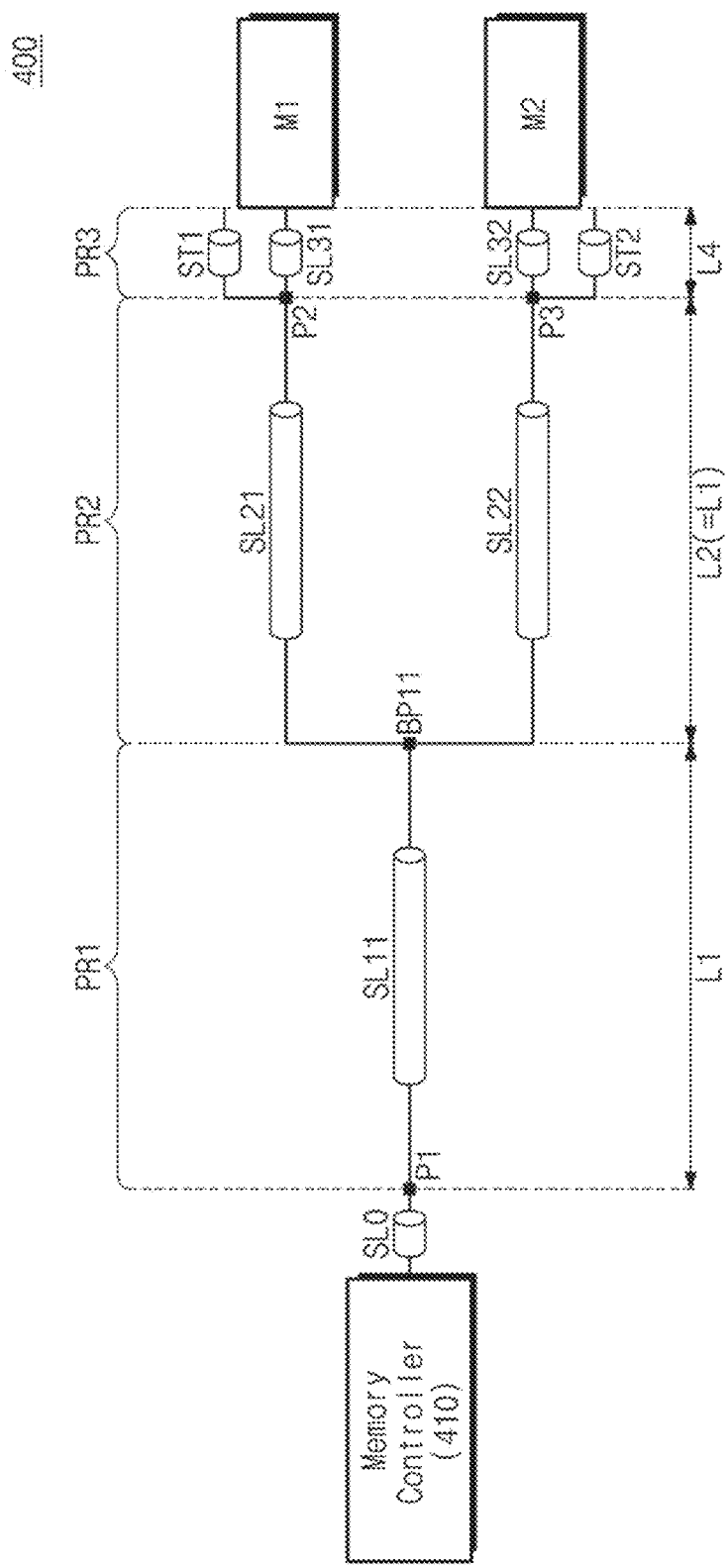
FIGS. 10A to 10D are block diagrams illustrating an electronic device according to some example embodiments of the present disclosure.

FIGS. 10A to 10D are block diagrams illustrating an electronic device according to some example embodiments of the present disclosure. Below, for convenience of description, additional description associated with the components described above will be omitted to avoid redundancy. Referring to FIG. 10A, an electronic device 400 may include a memory controller 410 and first and second memory devices M1 and M2. The memory controller 410 may be connected with the first and second memory devices M1 and M2 through signal lines SL0, SL11, SL21, SL22, SL31, and SL32 of the first channel CH1. A first end of the signal line SL0 may be connected with the memory controller 410, and a second end thereof may be connected with a first point P1. The signal lines SL11 to SL32 of the first channel CH1 may be classified into first to third sections PR1 to PR3 based on a branch point BP11 and points P1 to P3.

For example, the signal line SL11 from the first point P1 to the branch point BP11 may be included in the first section PR1. The signal line SL21 from the branch point BP11 to the second point P2 and the signal line SL22 from the branch point BP11 to the third point P3 may be included in the second section PR2. The signal line SL31 from the second point P2 to the first memory device M1 and the signal line SL32 from the third point P3 to the second memory device M2 may be included in the third section PR3.

For example, the signal line SL0 may be shorter than the signal line SL11 of the first section PR1. Each of the signal lines SL31 and SL32 of the third section PR3 may be shorter than the signal line SL21 and SL22 of the second section PR2. The signal lines SL0, SL31, and SL32 may be micro signal lines.

In some example embodiments, the electronic device 400 may further include stubs ST1 and ST2. A first end of each of the stubs ST1 and ST2 may be connected with a corresponding point, and a second end thereof may be left open-circuit without connection with any other electrical path. For example, the first end of the first stub ST1 may be connected with the second point P2, and the second end thereof may be left open-circuit without connection with any other electrical path. The first end of the second stub ST2 may be connected with the third point P3, and the second end thereof may be left open-circuit without connection with any other electrical path.

A length from the first end to the second end of each of the stubs ST1 and ST2 may be equal to a length of the signal lines SL31 and SL32 of the third section PR3. That is, the length of each of the stubs ST1 and ST2 may correspond to the length of the signal lines SL31 and SL32 of the third section PR3. The length of each of the stubs ST1 and ST2 may be a fourth length L4. The fourth length L4 indicates a distance or a length from a first end to a second end of each of the signal lines SL31 and SL32 in the third section PR3. That is, the fourth length L4 indicates a distance from the second or third point P2 or P3 to the memory devices M1 and M2.

In some example embodiments, the length of the stubs ST1 and ST2 may be different from the length of the signal lines SL31 and SL32 of the third section PR3. For example, the length of the stubs ST1 and ST2 may be shorter than the length of the signal lines SL31 and SL32 of the third section PR3. Alternatively, the length of the stubs ST1 and ST2 may be longer than the length of the signal lines SL31 and SL32 of the third section PR3. The length of the stubs ST1 and ST2 may be K times the fourth length L4. In this case, "K" may be 0.1 to 5. Alternatively, the length of the stubs ST1 and ST2 may be 1 mm or more, and may be less than or equal to 5 times the fourth length L4.

In some example embodiments, as illustrated in FIG. 10A, the length of the first stub ST1 may be equal to the length of the second stub ST2. However, the present disclosure is not limited thereto. The length of the first stub ST1 and the length of the second stub ST2 may be different from each other.

As described above, the electronic device 400 may further include the stubs ST1 and ST2 at the points P2 and P3. As such, a signal reflected from an end of each of the stubs ST1 and ST2 may compensate for the distortion of signal due to a reflection signal. Accordingly, a signal characteristic of an electronic device performing a high-speed operation may be improved.

Figure 10B:
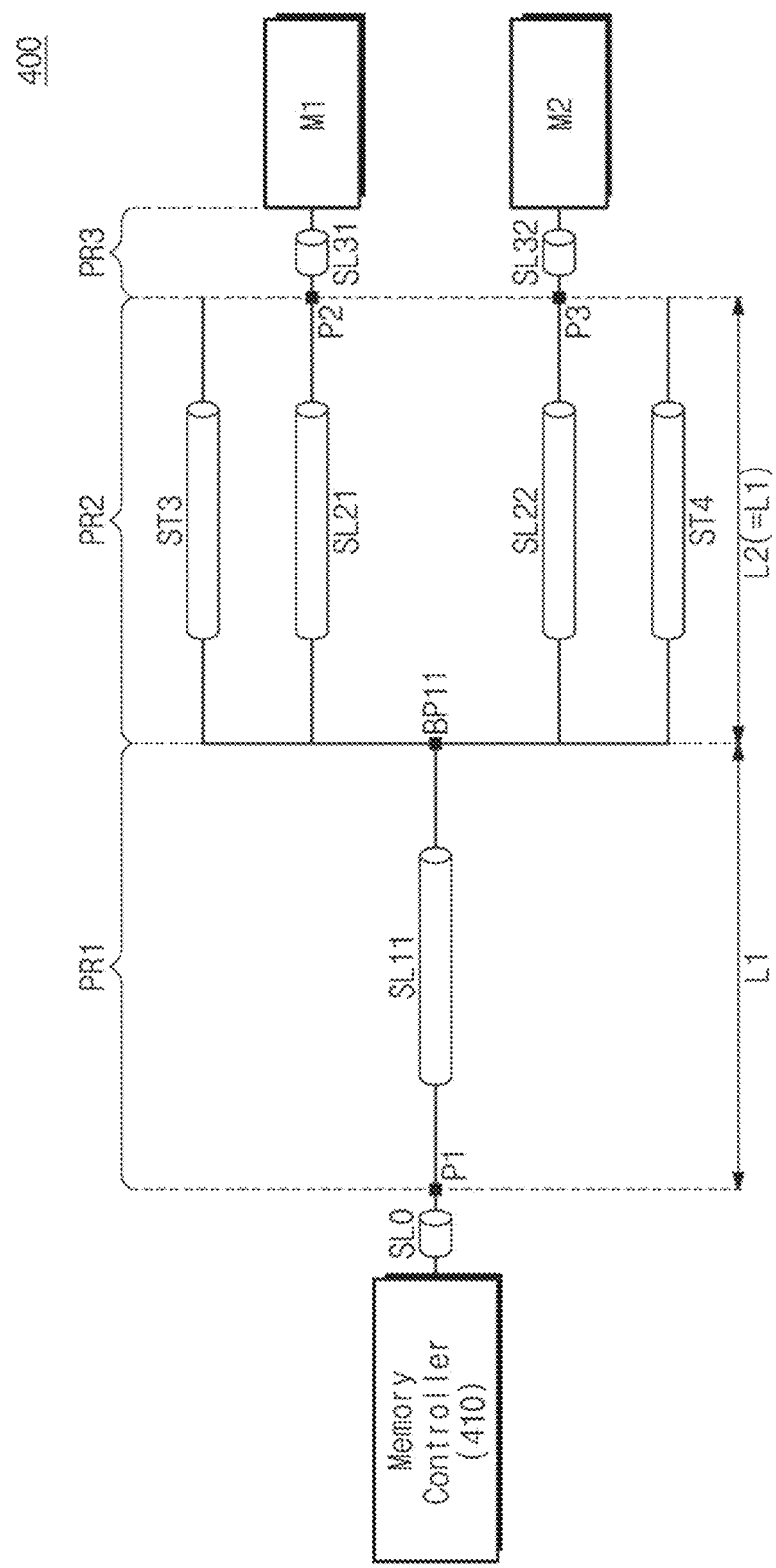

Referring to FIG. 10B, the electronic device 400 may include the memory controller 410 and the first and second memory devices M1 and M2. The memory controller 410 may be connected with the first and second memory devices M1 and M2 through the signal lines SL0, SL11, SL21, SL22, SL31, and SL32 of the first channel CH1. As in the above description, the signal lines SL11 to SL32 of the first channel CH1 may be classified into the first to third sections PR1 to PR3 based on the branch point BP11 and the points P1 to P3. This is similar to that described above, and thus, additional description will be omitted to avoid redundancy.

The electronic device 400 may further include stubs ST3 and ST4. For example, a first end of the third stub ST3 may be connected with the first branch point BP11, and a second end thereof may be left open-circuit without connection with any other electrical path. A first end of the fourth stub ST4 may be connected with the first branch point BP11, and a second end thereof may be left open-circuit without connection with any other electrical path.

A length from the first end to the second end of each of the stubs ST3 and ST4 may be equal to a length of the signal lines SL21 and SL22 of the second section PR2. That is, the length of each of the stubs ST3 and ST4 may correspond to the length of the signal lines SL21 and SL22 of the second section PR2.

Unlike the example illustrated in FIG. 10B, the length of the stubs ST3 and ST4 may be different from the length of the signal lines SL21 and SL22 of the second section PR2. The length of the stubs ST3 and ST4 may be shorter than the length of the signal lines SL21 and SL22 of the second section PR2. Alternatively, the length of the stubs ST3 and ST4 may be longer than the length of the signal lines SL21 and SL22 of the second section PR2. For example, the length of the stubs ST3 and ST4 may be K times the length of the signal lines SL21 and SL22 of the second section PR2. In this case, "K" may be 0.1 to 5. Alternatively, the length of the stubs ST3 and ST4 may be 1 mm or more, and may be less than or equal to 5 times the length of the signal lines SL21 and SL22 of the second section PR2.

In some example embodiments, the length of the third stub ST3 may be equal to the length of the fourth stub ST4. However, the present disclosure is not limited thereto. The length of the third stub ST3 and the length of the fourth stub ST4 may be different from each other.

Figure 10C:
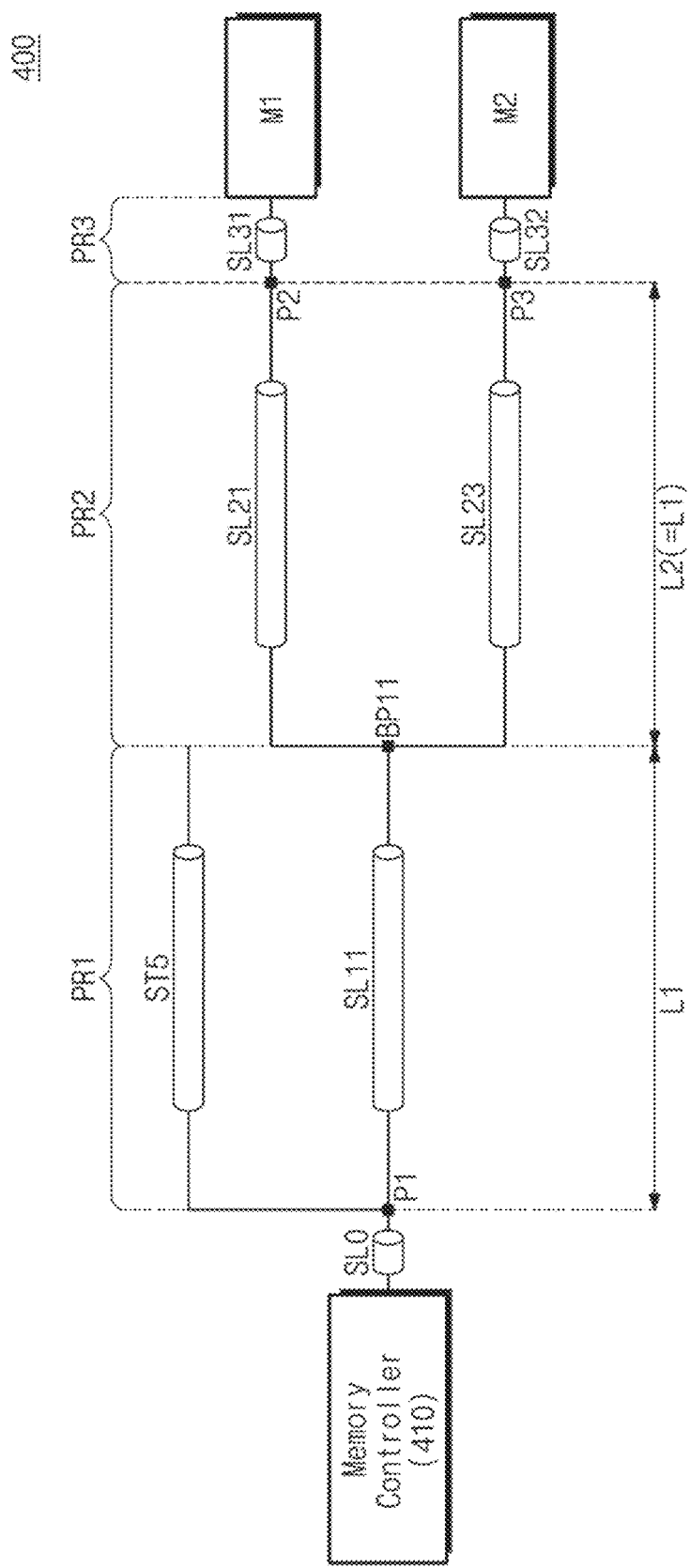

Referring to FIG. 10C, the electronic device 400 may include the memory controller 410 and the first and second memory devices M1 and M2. The memory controller 410 may be connected with the first and second memory devices M1 and M2 through the signal lines SL0, SL11, SL21, SL22, SL31, and SL32 of the first channel CH1. As in the above description, the signal lines SL11 to SL32 of the first channel CH1 may be classified into the first to third sections PR1 to PR3 based on the branch point BP11 and the points P1 to P3. This is similar to that described above, and thus, additional description will be omitted to avoid redundancy.

The electronic device 400 may further include a stub ST5. For example, a first end of the stub ST5 may be connected with the first point P1, and a second end thereof may be left open-circuit without connection with any other electrical path.

In some example embodiments, a length from the first end to the second end of the stub ST5 may be equal to the length of the signal line SL11 of the first section PR1. That is, the length of the stub ST5 may correspond to the length of the signal line SL11 of the first section PR1.

Unlike the example illustrated in FIG. 10C, the length of the stub ST5 may be different from the length of the signal line SL11 of the first section PR1. The length of the stub ST5 may be shorter than the length of the signal line SL11 of the first section PR1. Alternatively, the length of the stub ST5 may be longer than the length of the signal line SL11 of the first section PR1. For example, the length of stub ST5 may be K times the length of the signal line SL11 of the first section PR1. In this case, "K" may be 0.1 to 5. Alternatively, the length of the stub ST5 may be 1 mm or more, and may be less than or equal to 5 times the length of the signal line SL11 of the first section PR1.

Figure 10D:
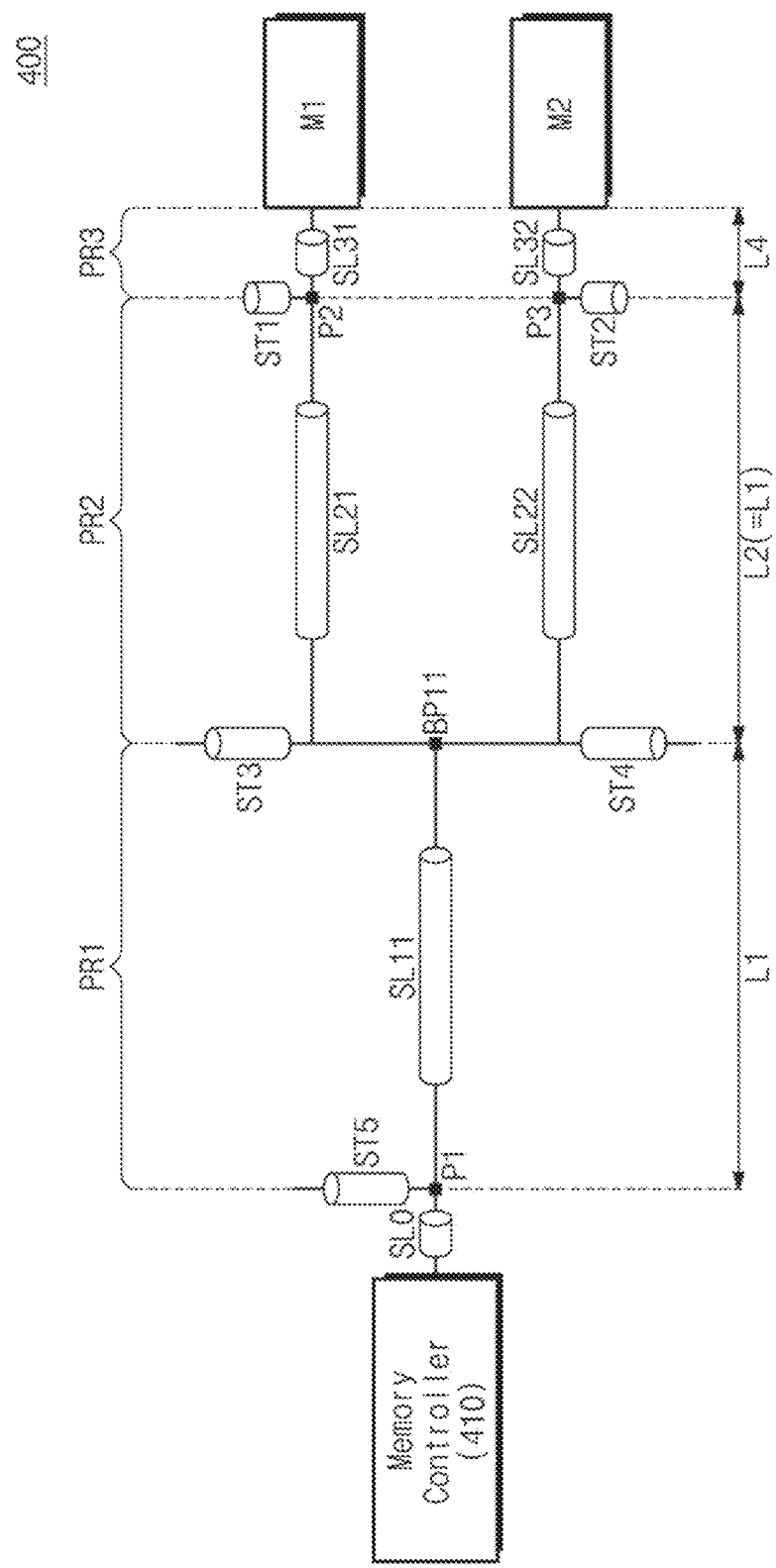

Referring to FIG. 10D, the electronic device 400 may include the memory controller 410 and the first and second memory devices M1 and M2. The memory controller 410 may be connected with the first and second memory devices M1 and M2 through the signal lines SL0, SL11, SL21, SL22, SL31, and SL32 of the first channel CH1. As in the above description, the signal lines SL11 to SL32 of the first channel CH1 may be classified into the first to third sections PR1 to PR3 based on the branch point BP11 and the points P1 to P3. This is similar to that described above, and thus, additional description will be omitted to avoid redundancy.

The electronic device 400 may further include stubs ST1 to ST5. For example, a first end of the first stub ST1 may be connected with the second point P2, and a second end thereof may be left open-circuit without connection with any other electrical path. A first end of the second stub ST2 may be connected with the third point P3, and a second end thereof may be left open-circuit without connection with any other electrical path. A first end of the third stub ST3 may be connected with the branch point BP11, and a second end thereof may be left open-circuit without connection with any other electrical path. A first end of the fourth stub ST4 may be connected with the branch point BP11, and a second end thereof may be left open-circuit without connection with any other electrical path. A first end of the fifth stub ST5 may be connected with the first point P1, and a second end thereof may be left open-circuit without connection with any other electrical path.

A length of each of the stubs ST1 to ST5 may be equal to or different from a length of a corresponding signal line. The length of each of the stubs ST1 to ST5 may be shorter or longer than the length of the corresponding signal line. For example, the length of each of the stubs ST1 to ST5 may be K times the length of the corresponding signal line. In this case, "K" may be 0.1 to 5. Alternatively, the length of each of the stubs ST1 to ST5 may be 1 mm or more, and may be less than or equal to 5 times the length of the corresponding signal line.

The corresponding signal line of each of the stubs ST1 to ST5 may indicate a signal line connected with a point or a branch point connected with one end of each of the stubs ST1 to ST5. For example, the signal line corresponding to the first stub ST1 may include the signal line SL31 connected with the second point P2 connected with the first stub ST1.

In some example embodiments, unlike FIG. 10D, the stubs ST1 to ST5 may be connected with any other place except for a branch point or a point between signal lines. For example, each of the stubs ST1 to ST5 may be connected between a first end and a second end of the corresponding signal line. That is, each of the stubs ST1 to ST5 may be connected with a middle part of the corresponding signal line.

For example, the first end of the first stub ST1 may be connected between a first end and a second end of the signal line SL31, not the second point P2, and the second end of the first stub ST1 may be left open-circuit without connection with any other electrical path. The first end of the second stub ST2 may be connected between a first end and a second end of the signal line SL32, not the third point P3, and the second end of the second stub ST2 may be left open-circuit without connection with any other electrical path. The first end of the third stub ST3 may be connected between a first end and a second end of the signal line SL21, not the branch point BP11, and the second end of the third stub ST3 may be left open-circuit without connection with any other electrical path. The first end of the fourth stub ST4 may be connected between a first end and a second end of the signal line SL22, not the branch point BP11, and the second end of the fourth stub ST4 may be left open-circuit without connection with any other electrical path. The first end of the fifth stub ST5 may be connected between a first end and a second end of the signal line SL11, not the first point P1, and the second end of the fifth stub ST5 may be left open-circuit without connection with any other electrical path.

The electronic device 400 of FIG. 10D may include the first to fifth stubs ST1 to ST5. However, the present disclosure is not limited thereto. For example, unlike the example illustrated in FIG. 10D, the electronic device 400 may include at least one of the first to fifth stubs ST1 to ST5. For example, the electronic device 200 may include the first and fourth stubs ST1 and ST4 only.

As illustrated in FIGS. 10A to 10D, in the electronic device 400 including stubs, the length of the signal line SL11 of the first section PR1 and the length of the signal lines SL21 and SL22 of the second section PR2 may be equal. However, the present disclosure is not limited thereto. As illustrated in FIGS. 3A to 4, the length of the signal line SL11 of the first section PR1 and the length of the signal lines SL21 and SL22 of the second section PR2 may be equal or different. A ratio of the length of the signal line SL11 of the first section PR1 to the length of the signal lines SL21 and SL22 of the second section PR2 may be a given ratio. For example, the given ratio may be 3/7 to 7/3.

FIG. 11 is a block diagram illustrating a channel of FIG. 9A in more detail. Referring to FIG. 9A, the electronic device 300 may include the memory controller 310 and the first and second memory devices M1 and M2. For brevity of drawing and convenience of description, additional description associated with components the same as or similar to the above components will be omitted to avoid redundancy.

In some example embodiments, the signal line SL11 of the first section PR1 may include a first sub signal line SL11a and a second sub signal line SL11b. The signal line SL21 of the second section PR2 may include a third sub signal line SL21a and a fourth sub signal line SL21b.

A signal corresponding to a bidirectional signal may be transferred through the first sub signal line SL11a and the third sub signal line SL21a. The signal corresponding to the bidirectional signal may include a data signal DQ and a data strobe signal DQS. For example, the memory controller 310 may send the data signal DQ corresponding to write data to the first memory device M1 through the first sub signal line SL11a and the third sub signal line SL21a. The first memory device M1 may send the data signal DQ corresponding to read data to the memory controller 310 through the first sub signal line SL11a and the third sub signal line SL21a.

Control signals CTRL corresponding to a unidirectional signal may be transferred through the second sub signal line SL11b and the fourth sub signal line SL21b. The control signals CTRL may include a command latch enable signal CLE, an address latch enable signal ALE, a read enable signal RE, a write enable signal WE, and the like. For example, the memory controller 310 may send the write enable signal WE to the first memory device M1 through the second sub signal line SL11b and the fourth sub signal line SL21b.

As described above, each of signal lines included in the first channel CH1 of an electronic device described with reference to FIGS. 1 to 10D may include a sub signal line transferring a bidirectional signal and a sub signal line transferring a unidirectional signal.

The above example embodiments are described with reference to a write operation of the electronic device (i.e., an operation in which a memory controller sends a signal to one of a plurality of memory devices), but the present disclosure is not limited thereto. For example, in a read operation of the electronic device, one (e.g., a first memory device) of the plurality of memory devices may send an input signal (e.g., read data) to the memory controller. In this case, a signal line length of a specific section may be extended such that a reflection signal coming from another of the plurality of memory devices is not introduced into the memory controller or the first memory device or is attenuated.

Figure 12A:
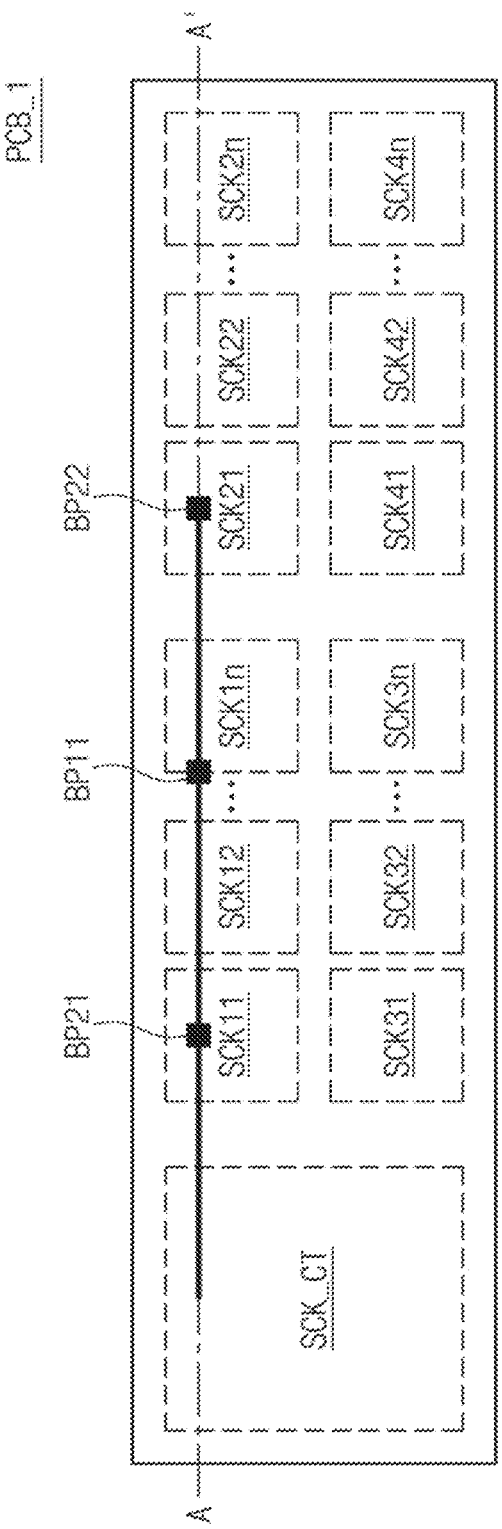
FIGS. 12A to 12G are views illustrating a printed circuit board according to some example embodiments of the inventive concept.
Figure 12B:
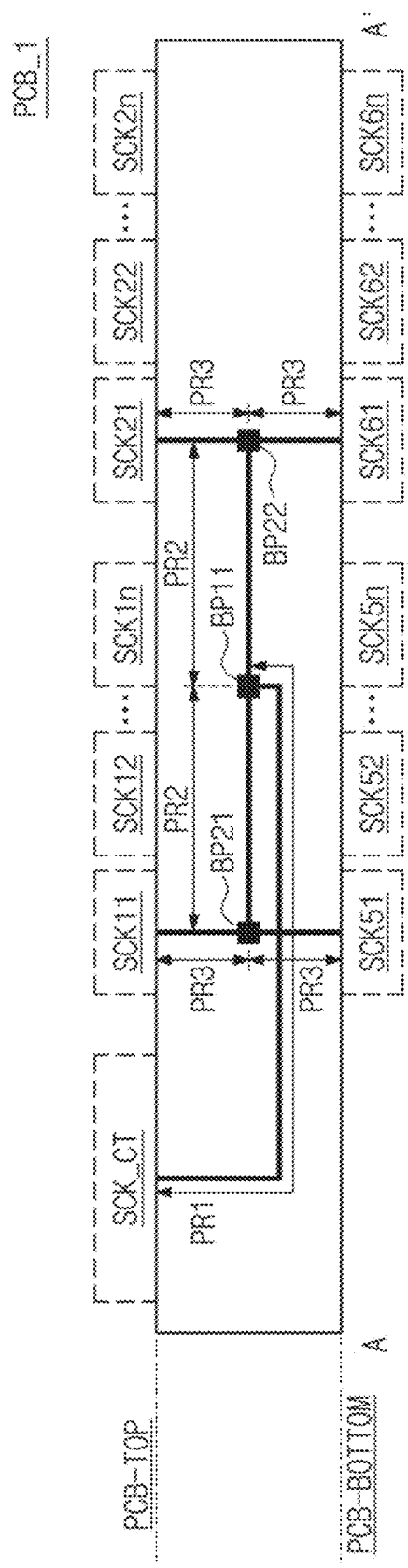

FIGS. 12A to 12G are views illustrating a printed circuit board according to some example embodiments of the inventive concept. FIG. 12A is a plan view illustrating a top surface of a printed circuit board PCB_1 according to some example embodiments of the present disclosure, and FIG. 12B is a cross-sectional view of the printed circuit board PCB_1 taken along line A-A' of FIG. 12A.

An electronic device may include a printed circuit board, a memory controller, and a plurality of memory devices. The memory controller and the plurality of memory devices are described above, and thus, additional description will be omitted to avoid redundancy. According to the example embodiments of the present disclosures described with reference to FIGS. 1 to 11, to reduce the influence of the reflection signal, signal lines included in the printed circuit board may have a given ratio, or a stub(s) may be added thereto. Signal lines formed in a metal layer will be described in detail with reference to the following drawings.

In FIGS. 12A to 12G, there is illustrated some example embodiments in which a signal line electrically connected with a part of a plurality of sockets SCK11 to SCK4n. However, the present disclosure is not limited thereto. For example, the remaining sockets may also be electrically connected with the remaining signal lines. In some example embodiments, a signal line may be included in a metal layer of the printed circuit board PCB_1. The metal layer may be implemented with a multi-layer including a plurality of layers. In some example embodiments, a printed circuit board capable of being applied to the electronic device 100 of FIG. 3A will be described with reference to FIGS. 12A and 12B.

Referring to FIGS. 12A and 12B, the printed circuit board PCB_1 may include a controller socket SCK_CT and the plurality of sockets SCK11 to SCK4n. In FIGS. 12A and 12B, the controller socket SCK_CT may be located in one side region of the printed circuit board PCB_1. For example, the controller socket SCK_CT may be disposed in one side region of the printed circuit board PCB_1, and the plurality of sockets SCK11 to SCK4n may be disposed (or arranged) in the remaining region thereof. The controller socket SCK_CT may be a region, a component, or a device in which the memory controller is mounted. The plurality of sockets SCK11 to SCK4n may be regions, components, or devices in which plural memory devices are respectively mounted. Although not clearly illustrated in drawings, additional sockets may be further formed on a bottom surface of the printed circuit board PCB_1. The plurality of memory devices may be mounted in the additional sockets formed on the bottom surface of the printed circuit board PCB_1.

Each of the memory controller and the plurality of memory devices may be mounted in the corresponding socket, and the memory controller and the plurality of memory devices may communicate with each other through the signal line included in the printed circuit board. The printed circuit board may include the signal line. The signal line may be a signal transmission path between the memory controller and the memory devices. That is, the signal line may be configured to make electrical connection between the plurality of sockets SCK11 to SCK4n and the controller socket SCK_CT. In some example embodiments, the signal line may be formed in a metal layer or a wire layer of the printed circuit board PCB_1.

The controller socket SCK_CT may be electrically connected with the first branch point BP11. The first branch point BP11 may be spaced from the controller socket SCK_CT as much as a given distance. The first branch point BP11 may be electrically connected with each of the second and third branch points BP21 and BP22.

The second branch point BP21 may be electrically connected with each of the sockets SCK11 and SCK51, and the third branch point BP22 may be electrically connected with the sockets SCK21 and SCK61. In this case, as illustrated in FIG. 12B, a length of the first section PR1 may be equal to a length of the second section PR2. A ratio of the length of the first section PR1 to the length of the second section PR2 may be 3/7 to 7/3.

For example, the sockets SCK11, SCK21, SCK51, and SCK61 may be electrically connected with the controller socket SCK_CT through the same channel (i.e., one signal line). In this case, the sockets SCK11 and SCK51 may be disposed to face each other with respect to the printed circuit board PCB_1, and the sockets SCK21 and SCK61 may be disposed to face each other with respect to the printed circuit board PCB_1. In other words, the sockets SCK11 and SCK21 may be disposed on a top surface PCB_TOP of the printed circuit board PCB_1, and the sockets SCK51 and SCK61 may be disposed on a bottom surface PCB_BOTTOM of the printed circuit board PCB_1.

In this case, the sockets SCK11 and SCK21 located on the top surface PCB_TOP may be sockets that are not adjacent to each other. For example, any other sockets (e.g., SCK12 to SCK1n) may be interposed between the sockets SCK11 and SCK21 connected with the same channel (i.e., one signal line), and the other sockets (e.g., SCK12 to SCK1n) may be electrically connected with the controller socket SCK_CT through a separate signal line. The sockets SCK51 and SCK61 located on the bottom surface PCB_BOTTOM may be sockets that are not adjacent to each other. That is, any other sockets (e.g., SCK52 to SCK5n) may be interposed between the sockets SCK51 and SCK61 connected with one signal line, and the other sockets (e.g., SCK52 to SCK5n) may be electrically connected with the controller socket SCK_CT through a separate signal line.

In some example embodiments, in a conventional electronic device, sockets adjacent to each other are electrically connected with a controller socket through one signal line. In this case, because branch points are defined in surrounding regions of the adjacent sockets, a length of a first section is relatively short. In contrast, according to some example embodiments of the present disclosure, a length of the second section PR2 may be relatively long by connecting sockets (e.g., SCK11 and SCK21), which are not adjacent to each other, with the controller socket SCK_CT through one signal line. Accordingly, the influence of the reflection signal occurring between memory devices respectively mounted in corresponding sockets may decrease.

The printed circuit board PCB_1 illustrated in FIGS. 12A and 12B is an example, and the present disclosure is not limited thereto. For example, in the printed circuit board PCB_1, a location of each of the branch points BP11, BP21, and BP22 may be variously changed without departing from the scope and spirit of the inventive concepts.

For example, the first branch point BP11 may be located in a region of the socket SCK11, a region of the socket SCK21, or any other region, and signal lines of the first and second sections PR1 and PR2 may be defined such that a length of the first section PR1 and a length of the second section PR2 are equal. Alternatively, the signal lines of the first and second sections PR1 and PR2 may be defined such that the length of the first section PR1 and the length of the second section PR2 have a given ratio.

In some example embodiments, a total length of signal lines respectively connecting the controller socket SCK_CT with a plurality of sockets may be variously determined within a range from about 50 mm to about 200 mm. For example, a length of a signal line connecting the controller socket SCK_CT and the socket SCK11 may be 50 mm, and a length of a signal line connecting the controller socket SCK_CT and the socket SCK2n may be 200 mm.

Below, for convenience of description, it is assumed that a length of signal lines of the third section PR3 is relatively small compared to a length of signal lines of the first and second sections PR1 and PR2. That is, it is assumed that the length of the third section PR3 is small enough to ignore compared to the length of the signal lines of the first and second sections PR1 and PR2.

For example, it is assumed that a length of a signal line connecting the controller socket SCK_CT and the socket SCK11 is 50 mm. The length of the signal line SL11 of the first section PR1 and the length of each of the signal lines SL21 and SL22 of the second section PR2 may be equal. That is, the length of the signal line SL11 of the first section PR1 may be 25 mm, and the length of each of the signal lines SL21 and SL22 of the second section PR2 may be 25 mm.

Alternatively, the length of the signal line SL11 of the first section PR1 and the length of each of the signal lines SL21 and SL22 of the second section PR2 may have a given ratio. A ratio of the length of the signal line SL11 of the first section PR1 to the length of each of the signal lines SL21 and SL22 of the second section PR2 may be 3/7 to 7/3. For example, when the length of the signal line SL11 of the first section PR1 is 15 mm, the length of each of the signal lines SL21 and SL22 of the second section PR2 may be 35 mm. When the length of the signal line SL11 of the first section PR1 is 35 mm, the length of each of the signal lines SL21 and SL22 of the second section PR2 may be 15 mm.

For example, it is assumed that a length of a signal line connecting the controller socket SCK_CT and the socket SCK2n is 200 mm. The length of the signal line SL11 of the first section PR1 and the length of each of the signal lines SL21 and SL22 of the second section PR2 may be equal. That is, the length of the signal line SL11 of the first section PR1 may be 100 mm, and the length of each of the signal lines SL21 and SL22 of the second section PR2 may be 100 mm.

For example, when the length of the signal line SL11 of the first section PR1 is 60 mm, the length of each of the signal lines SL21 and SL22 of the second section PR2 may be 140 mm. When the length of the signal line SL11 of the first section PR1 is 140 mm, the length of each of the signal lines SL21 and SL22 of the second section PR2 may be 60 mm.

Figure 12C:
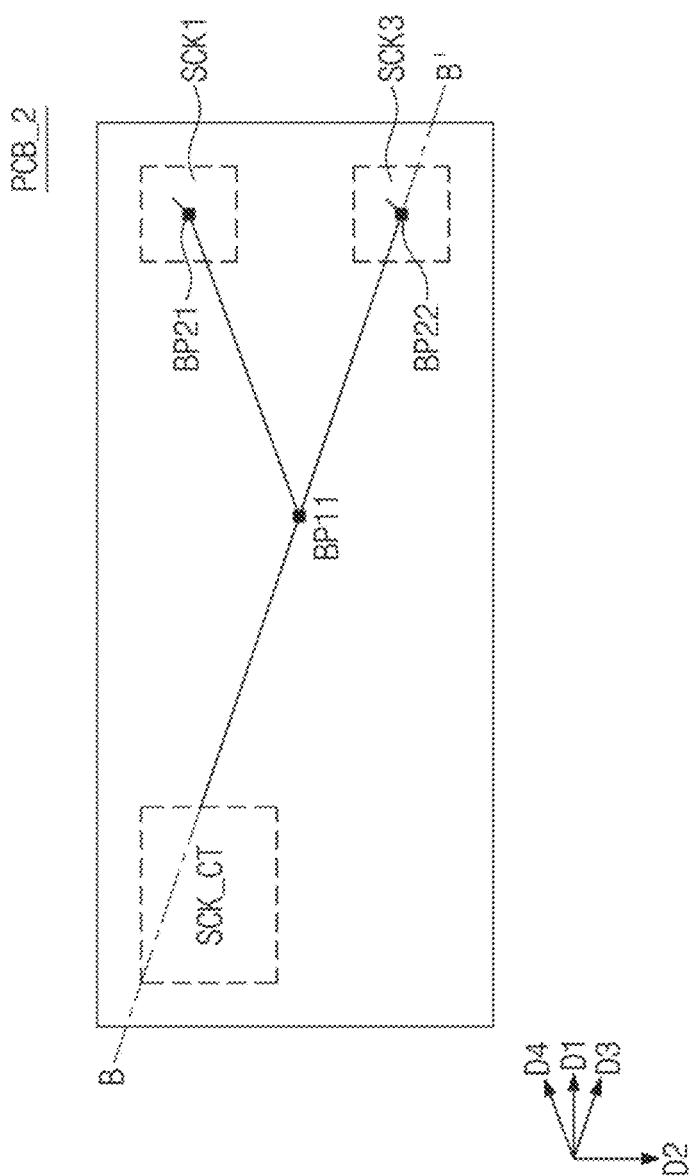
Figure 12D:
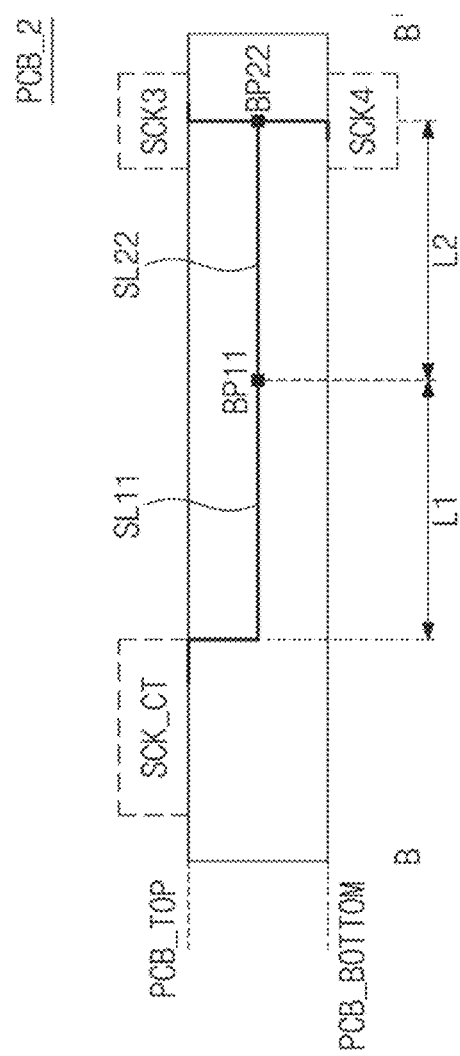

FIG. 12C is a plan view illustrating a top surface of a printed circuit board PCB_2 according to some example embodiments of the present disclosure, and FIG. 12D is a cross-sectional view of the printed circuit board PCB_2 taken along line B-B' of FIG. 12C. An electronic device may include the printed circuit board PCB_2, the memory controller, and the first to fourth memory devices M1 to M4. The memory controller and the first to fourth memory devices M1 to M4 are described above, and thus, additional description will be omitted to avoid redundancy. For a brief description, additional description associated with the components described above will be omitted to avoid redundancy.

Referring to FIGS. 12C and 12D, the printed circuit board PCB_2 may include the controller socket SCK_CT and a plurality of sockets SCK1 to SCK4. The controller socket SCK_CT may be a region, a component, or a device in which the memory controller is mounted. The first to fourth sockets SCK1 to SCK4 may be regions, components, or devices in which the first to fourth memory devices M1 to M4 are respectively mounted. Although not clearly illustrated in drawings, additional sockets SCK2 and SCK4 may be further formed on a bottom surface of the printed circuit board PCB. The second and fourth memory devices M2 and M4 may be respectively mounted in the additional sockets SCK2 and SCK4 formed on the bottom surface of the printed circuit board PCB_2.

For example, the controller socket SCK_CT and the first and third sockets SCK1 and SCK3 may be formed on a top surface PCB_TOP of the printed circuit board PCB_2, and the second and fourth sockets SCK2 and SCK4 may be formed on a bottom surface PCB_BOTTOM of the printed circuit board PCB_2. In some example embodiments, the second socket SCK2 may be disposed to face the first socket SCK1 with respect to the printed circuit board PCB_2, and the fourth socket SCK4 may be disposed to face the third socket SCK3 with respect to the printed circuit board PCB_2.

The controller socket SCK_CT may be located in one side region of the printed circuit board PCB_2. For example, the controller socket SCK_CT may be disposed in one side region of the printed circuit board PCB_2, and the first and third sockets SCK1 and SCK3 may be disposed (or arranged) in the remaining region thereof. The first socket SCK1 may be disposed to be spaced from the controller socket SCK_CT in a first direction D1 as much as a given distance. The second socket SCK2 may be disposed to be spaced from the first socket SCK1 in a second direction D2, which is perpendicular to the first direction D1, as much as a given distance.

For example, as in the above description, the signal line may be extended from the controller socket SCK_CT, and may be branched at the plurality of branch points BP11, BP21, and BP22. As such, the plurality of sockets SCK1 to SCK4 and the controller socket SCK_CT may be electrically connected. For example, the signal line SL11 from the controller socket SCK_CT to the branch point BP11 may be included in the first section PR1. The signal lines SL21 and SL22 from the branch point BP11 to the branch points BP21 and BP22 may be included in the second section PR2. The signal lines SL31 to SL34 from the branch point BP22 to the first to fourth sockets SCK1 to SCK4 may be included in the third section PR3.

In some example embodiments, the branch points BP11, BP21, and BP22 may be located in regions associated with the controller socket SCK_CT and the first to fourth sockets SCK1 to SCK4. For example, the branch point BP11 may be located between the controller socket SCK_CT and the first and third sockets SCK1 and SCK3. The branch point BP21 may be located between the first and second sockets SCK1 and SCK2 and may be connected with the first and second sockets SCK1 and SCK2 through a via contact. The branch point BP22 may be located between the third and fourth sockets SCK3 and SCK4 and may be connected with the third and fourth sockets SCK3 and SCK4 through a via contact.

Alternatively, the branch point BP11 may be defined at a location spaced from the controller socket SCK_CT in a third direction D3 as much as the first length L1. For example, the third direction D3 may be a direction between the first direction D1 and the second direction D2. An angle between the first direction D1 and the third direction D3 may be an acute angle. The branch point BP22 may be defined at a location spaced from the branch point BP11 in the third direction D3 as much as the second length L2. The branch point BP21 may be defined at a location spaced from the branch point BP11 in a fourth direction D4 as much as the second length L2. For example, the fourth direction D4 may be a direction between the first direction D1 and a direction facing away from the second direction D2. An angle between the first direction D1 and the fourth direction D4 may be an acute angle. In this case, the first length L1 and the second length L2 may be equal. However, the present disclosure is not limited thereto. For example, a ratio of the first length L1 to the second length L2 may be 3/7 to 7/3. An optimum ratio of the first length L1 to the second length L2 may be determined such that a noise of a reflection signal is canceled out.

The branch points BP21 and BP22 may be defined at locations spaced from the sockets SCK1 to SCK4 in a vertical direction as much as a given distance(s). In some example embodiments, the vertical direction may refer to a direction that is perpendicular to a top surface or a bottom surface of the printed circuit board PCB_2. In other words, the vertical direction may refer to a direction passing through the top surface or the bottom surface of the printed circuit board PCB_2. As described above, the example embodiments of the present disclosure described with reference to FIGS. 1 to 11 may be implemented by forming branch points at the printed circuit board PCB_2.

Figure 12E:
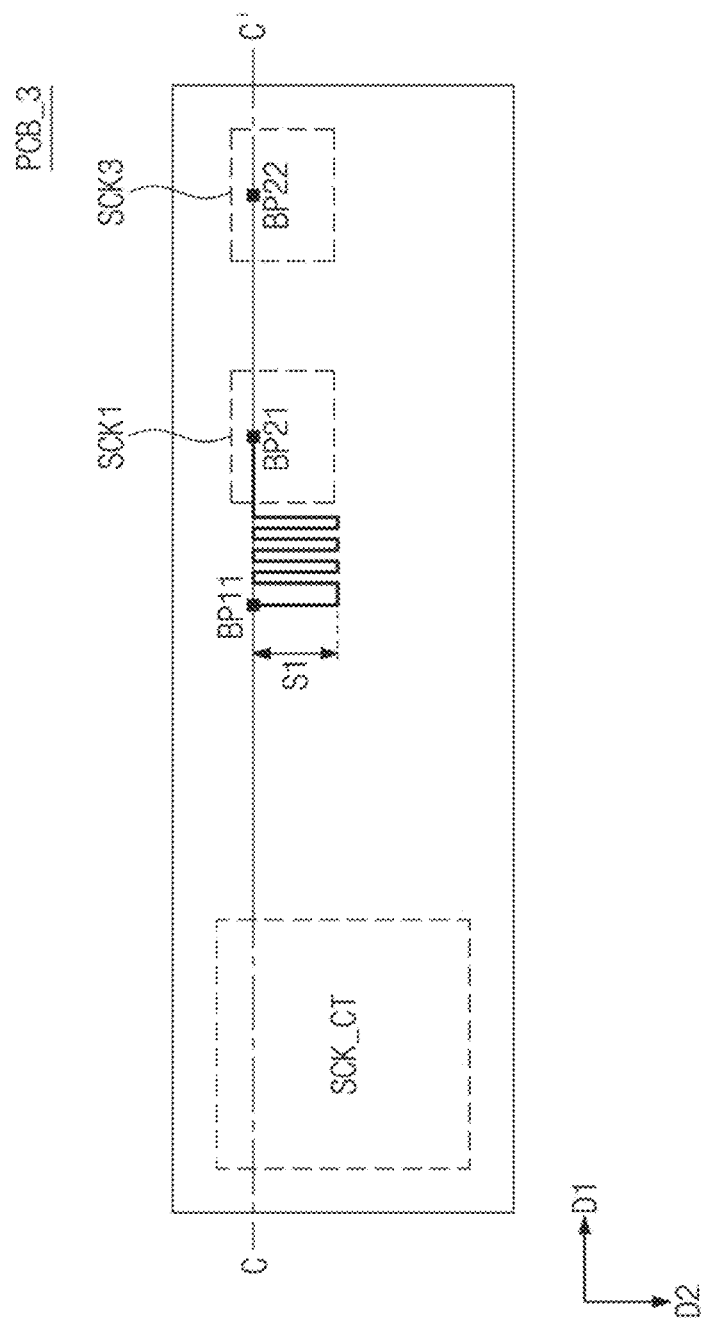
Figure 12F:
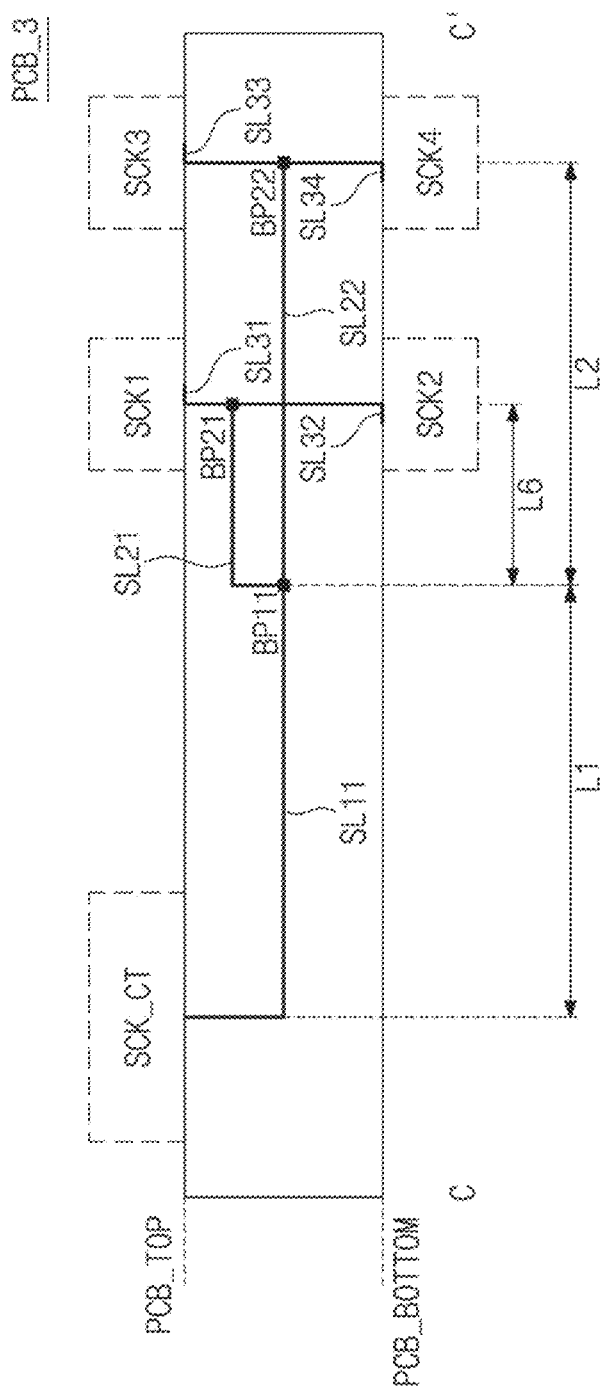

FIG. 12E is a plan view illustrating a top surface of a printed circuit board PCB_3 according to some example embodiments of the present disclosure, and FIG. 12F is a cross-sectional view of the printed circuit board PCB_3 taken along line C-C' of FIG. 12E. An electronic device may include the printed circuit board PCB_3, the memory controller, and the first to fourth memory devices M1 to M4. Referring to FIGS. 12E and 12F, the printed circuit board PCB_3 may include the controller socket SCK_CT and the plurality of sockets SCK1 to SCK4. For a brief description, additional description associated with the components described above will be omitted to avoid redundancy.

The controller socket SCK_CT may be located in one side region of the printed circuit board PCB_3. For example, the controller socket SCK_CT may be disposed in one side region of the printed circuit board PCB_3, and the first and third sockets SCK1 and SCK3 may be disposed (or arranged) in the remaining region thereof. Unlike the example illustrated in FIG. 12C, the controller socket SCK_CT and the first and third sockets SCK1 and SCK3 may be arranged in the first direction D1. The first socket SCK1 may be disposed at a location spaced from the controller socket SCK_CT in the first direction D1 as much as a given distance. The third socket SCK3 may be disposed at a location spaced from the first socket SCK1 in the first direction D1 as much as a given distance.

In some example embodiments, the branch points BP11, BP21, and BP22 may be located in regions associated with the controller socket SCK_CT and the first to fourth sockets SCK1 to SCK4. For example, the branch point BP11 may be located between the controller socket SCK_CT and the first socket SCK1. The branch point BP21 may be located between the first and second sockets SCK1 and SCK2 and may be connected with the first and second sockets SCK1 and SCK2 through a via contact. The branch point BP22 may be located between the third and fourth sockets SCK3 and SCK4 and may be connected with the third and fourth sockets SCK3 and SCK4 through a via contact.

Alternatively, the branch point BP11 may be defined at a location spaced from the controller socket SCK_CT in the first direction D1 as much as the first length L1. The branch point BP22 may be defined at a location spaced from the branch point BP11 in the first direction D1 as much as the second length L2. The branch point BP21 may be defined at a location spaced from the branch point BP11 in the first direction D1 as much as a sixth length L6. For example, the sixth length L6 may be shorter than the second length L2. The first length L1 and the second length L2 may be equal. However, the present disclosure is not limited thereto. For example, a ratio of the first length L1 to the second length L2 may be 3/7 to 7/3.

In some example embodiments, the signal line SL21 connecting the branch point BP11 and the branch point BP21 may not be formed in a straight line or with the shortest distance. The signal line SL21 may be formed in the shape of a zigzag pattern as illustrated in FIG. 12E. For example, to provide a longer electrical connection path between the branch point BP11 and the branch point BP21, the signal line SL21 may include portions extending in the first direction D1 and portions extending in the second direction D2. Ends of the portions extending in the first direction D1 and ends of the portions extending in the second direction D2 may be connected to each other. As such, a length of the signal line SL21 connecting the branch point BP11 and the branch point BP21 may be equal to the second length L2. That is, the signal line SL21 may have the second length L2 that is longer than the sixth length L6 being a straight distance between the branch point BP11 and the branch point BP21 in the first direction D1.

The branch points BP21 and BP22 may be defined at locations spaced from the sockets SCK1 to SCK4 in a vertical direction as much as given distances. In some example embodiments, the vertical direction may refer to a direction that is perpendicular to a top surface or a bottom surface of the printed circuit board PCB_3. In other words, the vertical direction may refer to a direction passing through the top surface or the bottom surface of the printed circuit board PCB_3. As described above, the example embodiments of the present disclosure described with reference to FIGS. 1 to 11 may be implemented by forming branch points at the printed circuit board PCB_3.

Figure 12G:
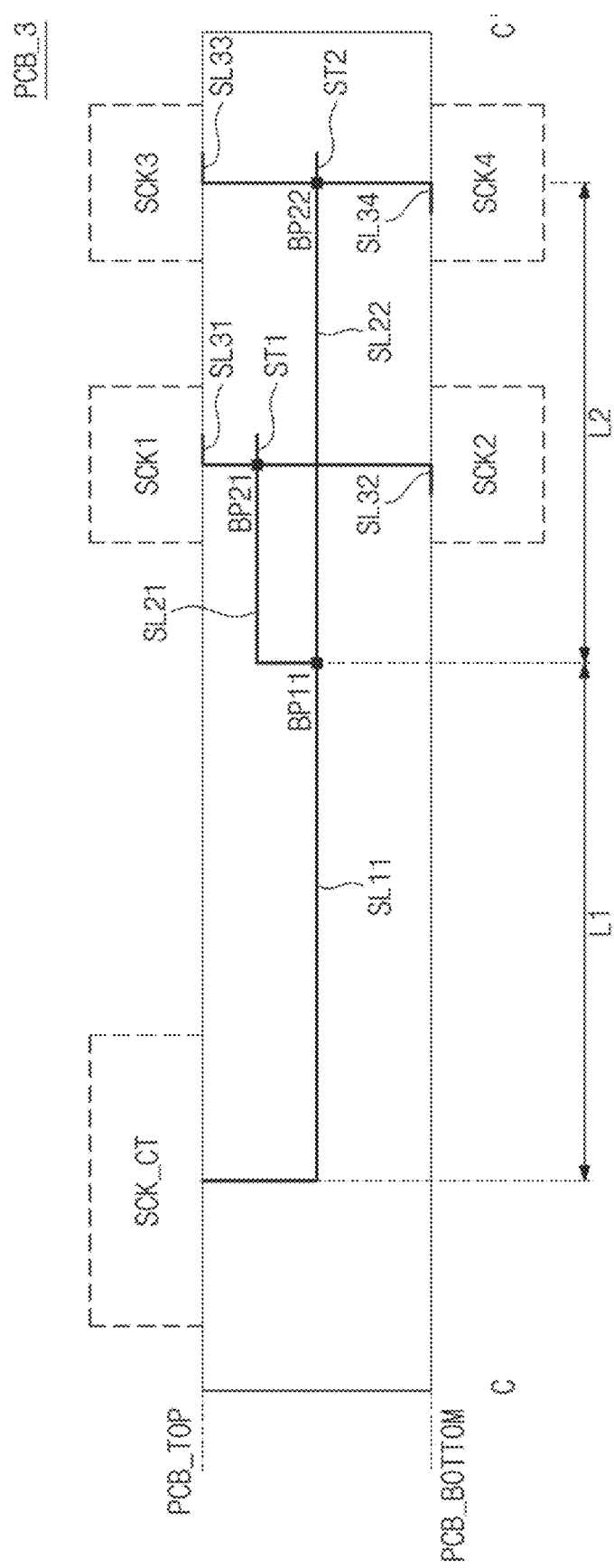

Referring to FIG. 12G, the printed circuit board PCB_3 may further include stubs ST1 and ST2. In some example embodiments, a first end of the first stub ST1 may be connected with the branch point BP21, and a second end of the first stub ST1 may be left open-circuit without connection with any other electrical path. The first stub ST1 may be formed to extend from the branch point BP21 in a horizontal direction. A first end of the second stub ST2 may be connected with the branch point BP22, and a second end of the second stub ST2 may be left open-circuit without connection with any other electrical path. The second stub ST2 may be formed to extend from the branch point BP22 in the horizontal direction.

For example, the horizontal direction may refer to a direction that is parallel to the top surface or the bottom surface of the printed circuit board PCB_3. For example, the horizontal direction may indicate a horizontal axis direction of a plane defined by the top surface of the printed circuit board PCB_3, a vertical axis direction of the plane, or a direction in which horizontal and vertical axes are combined. However, the present disclosure is not limited thereto. For example, directions of the stubs ST1 and ST2 may be variable.

Although not illustrated in drawings, a stub may be further connected with the branch point BP11 or a point between the controller socket SCK_CT and the branch point BP11. As described above, the example embodiments of the present disclosure described with reference to FIGS. 1 to 11 may be implemented by adding a stub(s) to the printed circuit board PCB_3.

Figure 13A:
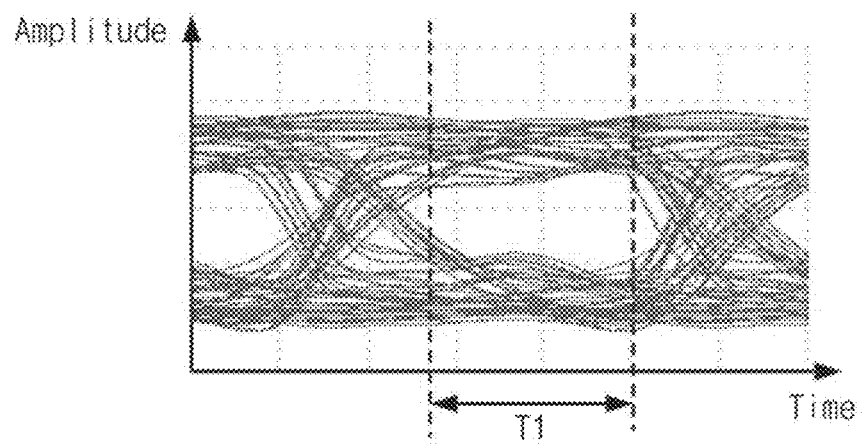
FIGS. 13A and 13B are timing diagrams for describing how a reflection signal is removed, according to some example embodiments of the present disclosure.
Figure 13B:
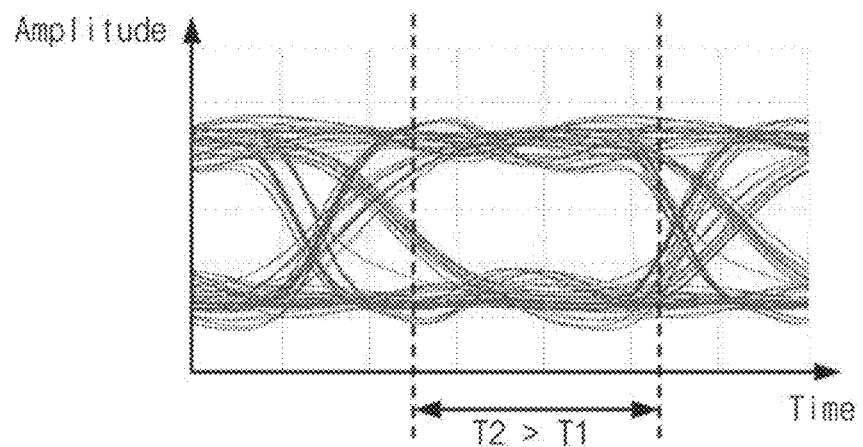

FIGS. 13A and 13B are timing diagrams for describing how a reflection signal is removed, according to some example embodiments of the present disclosure. In the timing diagrams of FIGS. 13A and 13B, a horizontal axis represents a time, and a vertical axis represents an amplitude of a signal. FIG. 13A shows a signal waveform in an electronic device according to the related part, and FIG. 13B shows a signal waveform in an electronic device according to the present disclosure.

As illustrated in FIG. 13A, in the case of the related art, a signal margin may correspond to a first time T1 due to a reflection signal. Due to the distortion of an input signal due to the reflection signal, an amplitude change of a signal may not be sufficient. In this case, a signal that is input to a memory device may not be determined normally.

In contrast, the electronic device according to example embodiments of the present disclosure may provide a signal margin corresponding to a second time T2 longer than the first time T1. That is, in the case where the first section PR1 and the second section PR2 have a given ratio or stubs are added thereto, the influence of the reflection signal coming from any other memory devices or a branch point may be reduced, thus increasing a signal margin or making an amplitude change of a signal sufficient. That is, the reliability of an input signal transferred to a memory device may be improved.

Figure 13C:
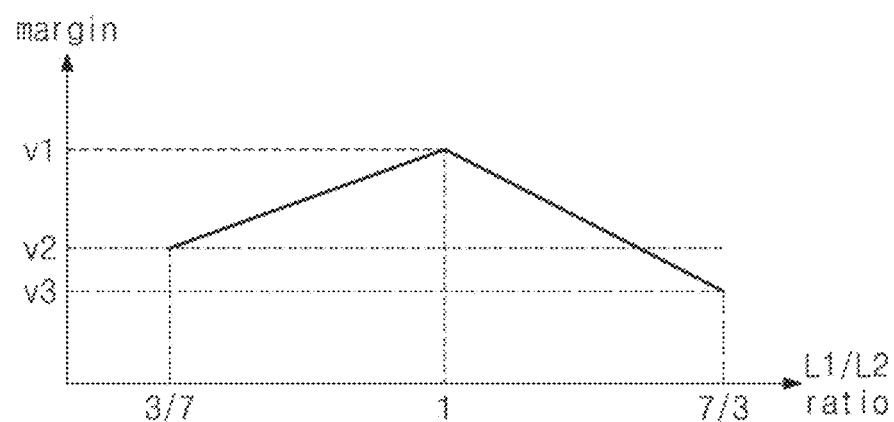
FIG. 13C is a graph for describing how a reflection signal is removed, according to some example embodiments of the present disclosure.

FIG. 13C is a graph for describing how a reflection signal is removed, according to some example embodiments of the present disclosure. In the graph of FIG. 13C, a horizontal axis represents a ratio of a length (e.g., the first length L1) of the signal line SL11 of the first section PR1 and a length (e.g., the second length L2) of each of the signal lines SL21 and SL22 of the second section PR2, and a vertical axis represents a signal margin.

In some example embodiments, when the ratio (e.g., L1/L2) of the first length L1 to the second length L2 is 3/7, the signal margin may have a second value v2; when the ratio of the first length L1 to the second length L2 is 1, the signal margin may have a first value v1; when the ratio of the first length L1 to the second length L2 is 7/3, the signal margin may have a third value v3. The first value v1 may be greater than the second value v2, and the second value v2 may be greater than the third value v3. That is, when the first length L1 and the second length L2 are equal, the signal margin may be the greatest.

Table 1 below shows signal margins according to a total length including the first length L1 and the second length L2 in the electronic device 10 or 100 described with reference to FIG. 2 or 3A. Referring to Table 1 below, a first margin "Margin 1" indicates a signal margin of the electronic device 10 of FIG. 2, and a second margin "Margin 2" indicates a signal margin of the electronic device 100 of FIG. 3A.

It is assumed that a length of signal lines of the third section PR3 is small enough to ignore compared to a length of signal lines of the first and second sections PR1 and PR2. A total line of signal lines respectively connecting a memory controller with memory devices is referred to as a "total length TL". For example, the total length TL means a length of a signal line of the first section PR1 and lengths of signal lines of the second section PR2.

For example, when the total length TL is 73 mm, in the electronic device 10 of FIG. 2, a length of the signal line S1 of the first section PR1 may be 60 mm, a length of each of the signal lines S2 and S3 of the second section PR2 may be 3 mm. In the electronic device 100 of FIG. 3A, a length (e.g., the first length L1) of the signal line SL11 of the first section PR1 may be 36.5 mm, and a length of each of the signal lines SL21 and SL22 of the second section PR2 may be 36.5 mm.

TABLE 1

| TL | 73 mm | 93 mm | 113 mm | 133 mm |
|---|---|---|---|---|
| Margin 1 | 174 ps | 179 ps | 223 ps | 218 ps |
| Margin 2 | 311 ps | 300 ps | 270 ps | 279 ps |

When the total length TL is 73 mm, the signal margin of the electronic device 10 of FIG. 2 may be 174 ps, and the signal margin of the electronic device 100 of FIG. 3A may be 311 ps. When the total length TL is 93 mm, the signal margin of the electronic device 10 of FIG. 2 may be 179 ps, and the signal margin of the electronic device 100 of FIG. 3A may be 300 ps. When the total length TL is 113 mm, the signal margin of the electronic device 10 of FIG. 2 may be 223 ps, and the signal margin of the electronic device 100 of FIG. 3A may be 270 ps. When the total length TL is 133 mm, the signal margin of the electronic device 10 of FIG. 2 may be 218 ps, and the signal margin of the electronic device 100 of FIG. 3A may be 279 ps. The above numerical values are an example for describing embodiment of the present disclosure clearly, and the present disclosure is not limited thereto. As described above, an electronic device according to some example embodiments of the present disclosure may increase a margin of a signal by adjusting a length of a signal line of the first section PR1 and a length of each of signal lines of the second section PR2.

Figure 14:
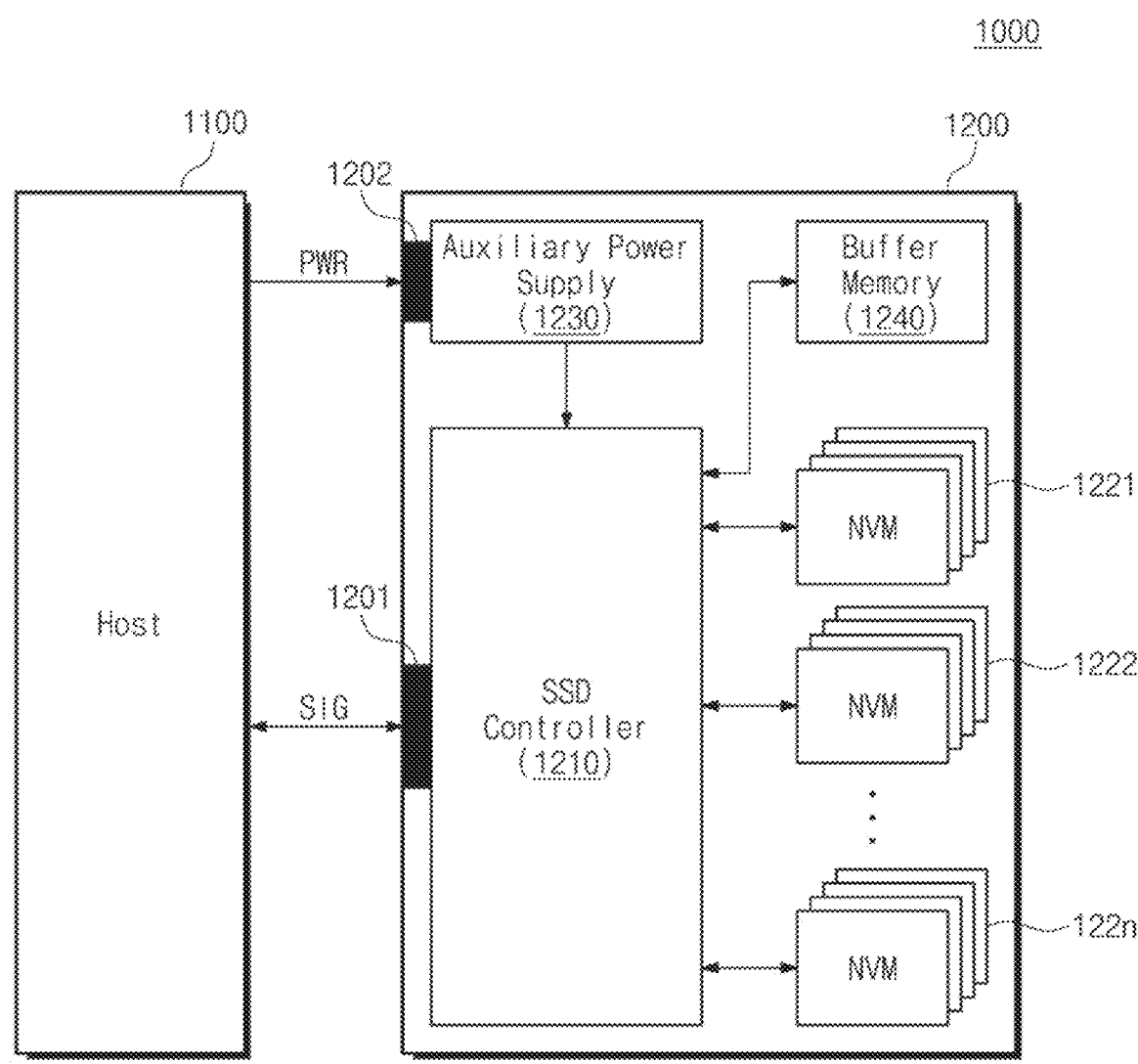
FIG. 14 is a block diagram illustrating an SSD system to which an electronic device according to some example embodiments of the present disclosure is applied.

FIG. 14 is a block diagram illustrating an SSD system to which an electronic device according to some example embodiments of the present disclosure is applied. Referring to FIG. 14, an SSD system 1000 includes a host 1100 and an SSD 1200.

The SSD 1200 exchanges a signal SIG with the host 1100 through a signal connector 1201 and is supplied with a power PWR through a power connector 1202. The SSD 1200 includes an SSD memory controller 1210, a plurality of flash memories 1221 to 122n, an auxiliary power supply 1230, and a buffer memory 1240.

The SSD memory controller 1210 may control the plurality of flash memories 1221 to 122n in response to the signal SIG received from the host 1100. The plurality of flash memories 1221 to 122n may operate under control of the SSD memory controller 1210. The auxiliary power supply 1230 is connected with the host 1100 through the power connector 1202. The auxiliary power supply 1230 may be charged by the power PWR supplied from the host 1100. When the power PWR is not smoothly supplied from the host 1100, the auxiliary power supply 1230 may power the SSD 1200.

In some example embodiments, the SSD 1200 may be a topology described with reference to FIGS. 1 to 13C. For example, various components included in the SSD 1200 may be mounted on a printed circuit board and may be electrically connected with each other through various signal lines included in the printed circuit board. In this case, as described above, the influence of a reflection signal on a plurality of memory devices may be reduced by defining signal lines between the SSD memory controller 1210 and the plurality of flash memories 1221 to 122n so as to have a given ratio or adding stubs thereto.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

The SSD system 1000 (or other circuitry, for example, the host 1100, auxiliary power supply 1230, buffer memory 1240, SSD memory controller 1210, memory controller 110, 210, 310, electronic device 100, 200, 300, or other circuitry discussed herein) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to example embodiments of the present disclosure, the influence due to a reflection signal between a memory controller and memory devices may decrease by extending a specific section of signal lines between the memory controller and the memory devices. As such, the reliability of signal may be prevented from being reduced (or have reduced reduction) due to the reflection signal. Accordingly, a printed circuit board with improved reliability, an electronic device, and an electronic device including the printed circuit board are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a first memory device, a second memory device, a third memory device, and a fourth memory device;
a memory controller configured to control the first to fourth memory devices;
a first signal line configured to make electrical connection between the memory controller and a first branch point;

a second signal line configured to make electrical connection between the first branch point and a second branch point;

a third signal line configured to make electrical connection between the first branch point and a third branch point, the second and third signal lines being distinct and separate, the second and third branch points being electrically connected to the first branch point in parallel;

a fourth signal line configured to electrically connect the second branch point and the first memory device;

a fifth signal line configured to electrically connect the second branch point and the second memory device, the fourth and fifth signal lines being distinct and separate, the first and second memory devices being electrically connected to the second branch point in parallel;

a sixth signal line configured to electrically connect the third branch point and the third memory device;

a seventh signal line configured to electrically connect the third branch point and the fourth memory device, the sixth and seventh signal lines being distinct and separate, the third and fourth memory devices being electrically connected to the third, branch point in parallel; and a stub including a first end electrically connected with at least one of the first to seventh signal lines, and a second end being left open-circuit without connection with any other electrical path.

2. The electronic device of claim 1, wherein a ratio of a length of the first signal line to a length of each of the second and third signal lines is greater than or equal to 3/7 to less than or equal to 7/3.

3. The electronic device of claim 1, wherein a length of the stub is 1 mm or more and is less than or equal to 5 times a length of a corresponding signal line of the stub.

4. The electronic device of claim 1, wherein the stub includes a first stub and a second stub, wherein a first end of the first stub is electrically connected with the second branch point, and a second end of the first stub is left open-circuit without connection with any other electrical path, and wherein a first end of the second stub is electrically connected with the third branch point, and a second end of the second stub is left open-circuit without connection with any other electrical path.

5. The electronic device of claim 4, wherein a length of the first stub is 1 mm or more and is less than or equal to 5 times a length of each of the fourth and fifth signal lines, and wherein a length of the second stub is 1 mm or more and is less than or equal to 5 times a length of each of the sixth and seventh signal lines.

6. The electronic device of claim 1, wherein the stub includes a first stub and a second stub, wherein a first end of the first stub is electrically connected with the first branch point, and a second end of the first stub is left open-circuit without connection with any other electrical path, and wherein a first end of the second stub is electrically connected with the first branch point, and a second end of the second stub is left open-circuit without connection with any other electrical path.

7. The electronic device of claim 6, wherein a length of the first stub is 1 mm or more and is less than or equal to 5 times a length of the second signal line, and wherein a length of the second stub is 1 mm or more and is less than or equal to 5 times a length of the third signal line.

8. The electronic device of claim 1, wherein the first signal line configured to make the electrical connection between the memory controller and the first branch point includes an eighth signal line configured to electrically connect the memory controller and a first point; and a ninth signal line configured to make electrical connection between the first point and the first branch point.

9. The electronic device of claim 8, wherein the stub includes a first stub, and wherein a first end of the first stub is electrically connected with the first point, and a second end of the first stub is left open-circuit without connection with any other electrical path.

10. The electronic device of claim 9, wherein a length of the first stub is 1 mm or more and is less than or equal to 5 times a length of the ninth signal line.

11. The electronic device of claim 1, wherein the memory controller exchanges a data signal (DQ) with the first to fourth memory devices through first sub signal lines among the first to seventh signal lines and sends a control signal (CTRL) to the first to fourth memory devices through second sub signal lines among the first to seventh signal lines.

12. The electronic device of claim 1, wherein the stub includes a first stub and a second stub, wherein a first end of the first stub is electrically connected between a first end and a second end of the fourth signal line, and a second end of the first stub is left open-circuit without connection with any other electrical path, and wherein a first end of the second stub is electrically connected between a first end and a second end of the seventh signal line, and a second end of the second stub is left open-circuit without connection with any other electrical path.

13. The electronic device of claim 1, wherein the stub includes a first stub and a second stub, wherein a first end of the first stub is electrically connected between a first end and a second end of the second signal line, and a second end of the first stub is left open-circuit without connection with any other electrical path, and wherein a first end of the second stub is electrically connected between a first end and a second end of the third signal line, and a second end of the second stub is left open-circuit without connection with any other electrical path.

14. The electronic device of claim 1, wherein the stub includes a first stub, and wherein a first end of the first stub is electrically connected between a first end and a second end of the first signal line, and a second end of the first stub is left open-circuit without connection with any other electrical path.

15. An electronic device comprising:

a first memory device, a second memory device, a third memory device, and a fourth memory device;

a memory controller configured to control the first to fourth memory devices;

a first signal line configured to make electrical connection between the memory controller and a first branch point;

a second signal line configured to make electrical connection between the first branch point and a second branch point;

a third signal line configured to make electrical connection between the first branch point and a third branch point, the second and third signal lines being distinct and separate, the second and third branch points being electrically connected to the first branch point in parallel;

a fourth signal line configured to electrically connect the second branch point and the first memory device;

a fifth signal line configured to electrically connect the second branch point and the second memory device, the fourth and fifth signal lines being distinct and separate, the first and second memory devices being electrically connected to the second branch point in parallel;

a sixth signal line configured to electrically connect the third branch point and the third memory device; and a seventh signal line configured to electrically connect the third branch point and the fourth memory device, the sixth and seventh signal lines being distinct and separate, the third and fourth memory devices being electrically connected to the third, branch point in parallel, wherein a ratio of a length of the first signal line to a length of each of the second and third signal lines is greater than or equal to 3/7 to less than or equal to 7/3.

16. The electronic device of claim 15, wherein a length of the second signal line and a length of the third signal line are different.

17. The electronic device of claim 15, further comprising:
a stub including a first end electrically connected with at least one of the first to seventh signal lines, and a second end being left open-circuit without connection with any other electrical path.

18. The electronic device of claim 17, wherein the stub includes a first stub and a second stub, wherein a first end of the first stub is electrically connected with the second branch point, and a second end of the first stub is left open-circuit without connection with any other electrical path, wherein a first end of the second stub is electrically connected with the third branch point, and a second end of the second stub is left open-circuit without connection with any other electrical path, and wherein a length of the first and second stubs is 1 mm or more and is less than or equal to 5 times a length of each of the fourth to seventh signal lines.

19. The electronic device of claim 17, wherein the stub includes a first stub and a second stub, wherein a first end of the first stub is electrically connected with the first branch point, and a second end of the first stub is left open-circuit without connection with any other electrical path, wherein a first end of the second stub is electrically connected with the first branch point, and a second end of the second stub is left open-circuit without connection with any other electrical path, wherein a length of the first stub is 1 mm or more and is less than or equal to 5 times a length of the second signal line, and wherein a length of the second stub is 1 mm or more and is less than or equal to 5 times a length of the third signal line.

20. An electronic device comprising:
a first memory device and a second memory device;
a memory controller configured to control the first and second memory devices;
a first signal line configured to make electrical connection between the memory controller and a first branch point;
a second signal line configured to electrically connect the first branch point and the first memory device; and
a third signal line configured to electrically connect the first branch point and the second memory device, the second and third signal lines being distinct and separate from one another, the second and third signal lines being distinct and separate from the first and second memory devices, the first and second memory devices being electrically connected to the first branch point in parallel, wherein a ratio of a length of the first signal line to a length of each of the second and third signal lines is greater than or equal to 3/7 to less than or equal to 7/3.

* * * * *